United States Patent
Harb et al.

(10) Patent No.: US 12,149,764 B2
(45) Date of Patent: Nov. 19, 2024

(54) SYSTEMS AND METHODS FOR ENHANCING GROUP MEDIA CONSUMPTION SESSIONS

(71) Applicant: Rovi Guides, Inc., San Jose, CA (US)

(72) Inventors: Reda Harb, Issaquah, WA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/965,447

(22) Filed: Oct. 13, 2022

(65) Prior Publication Data

US 2024/0129568 A1    Apr. 18, 2024

(51) Int. Cl.
*H04N 21/262* (2011.01)
*H04N 21/45* (2011.01)
*H04N 21/466* (2011.01)
*H04N 21/81* (2011.01)
*H04N 21/8545* (2011.01)

(52) U.S. Cl.
CPC ... *H04N 21/26241* (2013.01); *H04N 21/4532* (2013.01); *H04N 21/4661* (2013.01); *H04N 21/812* (2013.01); *H04N 21/8545* (2013.01)

(58) Field of Classification Search
CPC ........ H04N 21/26241; H04N 21/4532; H04N 21/4661; H04N 21/812; H04N 21/8545
See application file for complete search history.

(56) References Cited

U.S. PATENT DOCUMENTS

| | | | | |
|---|---|---|---|---|
| 5,652,615 A | * | 7/1997 | Bryant | H04H 20/103 725/35 |
| 7,805,373 B1 | * | 9/2010 | Issa | H04N 21/2541 705/54 |
| 8,554,049 B2 | | 10/2013 | Klappert et al. | |
| 9,066,115 B1 | * | 6/2015 | Cherry | H04N 21/8586 |
| 9,235,826 B1 | * | 1/2016 | Hamilton | G06Q 10/103 |
| 10,200,749 B2 | * | 2/2019 | McCallister | H04N 21/23424 |
| 10,349,107 B2 | | 7/2019 | Lanier et al. | |
| 11,317,126 B1 | | 4/2022 | Barton | |
| 11,871,050 B1 | * | 1/2024 | Koceski | H04N 21/23424 |
| 2002/0073084 A1 | * | 6/2002 | Kauffman | H04L 65/1101 |
| 2002/0178445 A1 | * | 11/2002 | Eldering | H04N 21/47202 705/14.69 |
| 2003/0139966 A1 | * | 7/2003 | Sirota | G06Q 30/0242 348/E5.002 |
| 2004/0194131 A1 | * | 9/2004 | Ellis | H04N 21/47 725/35 |

(Continued)

OTHER PUBLICATIONS

U.S. Appl. No. 17/965,454, filed Oct. 13, 2022, Reda Harb.

*Primary Examiner* — Timothy R Newlin
(74) *Attorney, Agent, or Firm* — Haley Guiliano LLP

(57) ABSTRACT

Systems and method are provided for enabling advertisement display during a group session. A media content item group session is initiated between a first computing device and a second computing device, and a first portion of the media content item is received at the first and second computing devices. A period of time is identified for outputting one or more advertisements. A first selection of advertisements and a second selection of advertisements are identified for the respective first and second computing devices, where the run-times of the first and second selections are based on the period of time. The first and selection of advertisements are received and are output at the respective first and second computing devices.

16 Claims, 17 Drawing Sheets

(56) References Cited

U.S. PATENT DOCUMENTS

| | | | |
|---|---|---|---|
| 2005/0166224 A1* | 7/2005 | Ficco | H04N 21/242 725/35 |
| 2007/0168884 A1* | 7/2007 | Weeks | H04N 21/47815 348/E7.071 |
| 2007/0271137 A1* | 11/2007 | Vezza | G06Q 30/0272 705/14.39 |
| 2008/0304809 A1* | 12/2008 | Haberman | H04N 21/854 348/E7.071 |
| 2009/0276821 A1* | 11/2009 | Amento | H04N 21/44226 725/116 |
| 2010/0011407 A1* | 1/2010 | Herlein | H04N 7/165 725/146 |
| 2010/0070999 A1 | 3/2010 | Morris et al. | |
| 2011/0219400 A1* | 9/2011 | Candelore | H04N 21/4325 725/34 |
| 2012/0110619 A1* | 5/2012 | Kilar | H04N 21/23439 725/34 |
| 2012/0229588 A1* | 9/2012 | Greenfield | H04N 21/2387 348/E7.083 |
| 2012/0230652 A1* | 9/2012 | Mirsky | H04N 21/8547 386/E9.011 |
| 2012/0266190 A1* | 10/2012 | Shao | H04N 21/47202 725/32 |
| 2012/0272278 A1* | 10/2012 | Bedi | H04N 21/25435 725/105 |
| 2012/0307152 A1* | 12/2012 | Zaslavsky | H04N 21/4784 348/E5.099 |
| 2013/0014190 A1* | 1/2013 | Sansom | G06F 16/735 348/569 |
| 2013/0170818 A1* | 7/2013 | Klappert | G06Q 50/01 386/299 |
| 2014/0096167 A1* | 4/2014 | Lang | H04N 21/4788 725/91 |
| 2014/0096169 A1* | 4/2014 | Dodson | H04N 21/6543 725/97 |
| 2015/0003810 A1* | 1/2015 | Plotnick | H04N 21/262 386/249 |
| 2015/0067714 A1* | 3/2015 | Bhogal | H04N 21/4532 725/25 |
| 2015/0067722 A1* | 3/2015 | Bjordammen | H04N 21/812 725/32 |
| 2015/0237411 A1* | 8/2015 | Khare | H04N 21/478 725/42 |
| 2016/0105734 A1 | 4/2016 | Packard et al. | |
| 2016/0127775 A1 | 5/2016 | Zilberstein et al. | |
| 2016/0253710 A1* | 9/2016 | Publicover | H04W 4/21 705/14.66 |
| 2017/0118538 A1* | 4/2017 | Ashbacher | H04N 21/262 |
| 2017/0289608 A1 | 10/2017 | Li et al. | |
| 2018/0199074 A1* | 7/2018 | Potesta | H04N 21/23424 |
| 2018/0270526 A1* | 9/2018 | Nguyen | H04N 21/4331 |
| 2019/0174203 A1* | 6/2019 | Suresh | H04N 21/4331 |
| 2019/0268644 A1* | 8/2019 | Fradlis | H04N 21/251 |
| 2020/0351535 A1 | 11/2020 | Gupta et al. | |
| 2021/0274244 A1 | 9/2021 | Wondra et al. | |
| 2021/0289255 A1* | 9/2021 | Balint | H04N 21/812 |
| 2022/0321931 A1* | 10/2022 | Panje | H04N 21/2387 |
| 2022/0368743 A1 | 11/2022 | Miller | |
| 2023/0014831 A1* | 1/2023 | Marten | G06Q 50/01 |
| 2023/0325884 A1* | 10/2023 | Liu | G06Q 30/0251 705/14.66 |
| 2024/0040180 A1* | 2/2024 | Agrawal | H04N 21/25891 |
| 2024/0129572 A1 | 4/2024 | Harb et al. | |

\* cited by examiner

SYSTEMS AND METHODS FOR ENHANCING GROUP MEDIA CONSUMPTION SESSIONS

BACKGROUND

The present disclosure is directed towards systems and methods for enhancing group media consumption sessions. In particular, systems and methods are provided herein that enable an advertisement to be displayed during a group session and/or initiate a media content item group watch session with an identified contact.

SUMMARY

With the proliferation of over-the-top (OTT) platforms, users have required different ways to consume content items. One way that OTT providers have responded is to enable users to consume content items at the same time via a watch party, or group watch. Such a feature enables, for example, friends to watch the same content together at the same time and synchronize control of a content item, for example, if one user pauses the content item, it is paused for all users. Additional features include, for example, a chat and/or reactions that are shared with participants of the group watch session. However, the need for synchronization between all participants causes challenges around displaying advertisements, especially personalized advertisements, at all computing devices of a group watch session, not least to ensure that synchronized playback of the content item can resume after the advertisements are output at the respective computing devices. In addition, group watch sessions are initiated for a content item such that, on initiation of the group watch session, the content item starts at the beginning. This makes it prohibitive for a user to share a portion, such as a funny clip, of a content item and to initiate a group session based on that portion with other users.

To overcome these problems, systems and methods are provided herein that enable an advertisement to be displayed during a group session and/or initiate a media content item group watch session with an identified contact.

Systems and methods are described herein for enabling advertisement display during a group session. In accordance with some aspects of the disclosure, a method is provided. The method includes initiating a media content item group session between a first computing device and a second computing device and receiving a first portion of the media content item at the first computing device and the second computing device. A period of time for outputting one or more advertisements is identified. A first selection of one or more advertisements is identified for the first computing device and a second selection of one or more advertisements is identified for the second computing device, wherein the first and second selections have respective first and second run-times based on the period of time. The first selection of advertisements is received at the first computing device and the second selection of advertisements is received at the second computing device. An advertisement of the first selection of advertisements is output at the first computing device and an advertisement of the second selection of advertisements is output at the second computing device.

In an example system, a group watch session is initiated between a plurality of computing devices. A content item is displayed via the plurality of computing devices, and, after a period of time, a commercial break is initiated. Advertisements to display in the break may be personalized for each participant, and, to ensure that the content item can resume at the same time, the advertisements are selected based on a common period of time for the commercial break, such that the run-time of the advertisements is the same for all participants. After display of the advertisements at the computing devices, the content item resumes at the computing devices at the same time.

The selection's first run-time and/or the second run-time may be equal to the period of time. The first selection's first run-time may be less than the period of time and a short-form advertisement with a run-time equal to the difference in the first advertisement's run-time and the period of time may be identified. The short-form advertisement may be incorporated into the first selection of advertisements. The first run-time may be different from the time period, and the difference between the first advertisement's run-time and the period of time may be identified. A playback speed for an advertisement of the first selection of advertisements may be identified that causes the first runtime to be equal to the period of time and outputting the advertisement of the first selection of advertisements may further comprise outputting the advertisement of the first selection of advertisements at the identified playback speed.

A first user profile associated with the first computing device and a second user profile associated with the second computing device may be identified. Identifying the first selection of advertisements may further comprise identifying the first selection of advertisements based on the first user profile and identifying the second selection of advertisements may further comprise identifying the second selection of advertisements based on the second user profile.

Identifying the first selection of advertisements may further comprise identifying an interactive advertisement for inclusion in the first selection of advertisements and identifying an interaction time period associated with the interactive advertisement based on the time period. Outputting the advertisement of the first selection of advertisements may further comprise outputting the interactive advertisement for the interaction time period. Outputting the interactive advertisement may further comprise outputting the interactive advertisement and a timer based on the interaction time period for display. Receiving the first selection of advertisements may further comprise receiving a first advertisement of the first selection of advertisements from a server and generating the interactive advertisement of the first selection of advertisements at the first computing device.

The first selection of advertisements may comprise a first personalizable advertisement having a first portion and a second portion and the second selection of advertisements may comprise a second personalizable advertisement having and a first portion and second portion. The first portion may be common to the first and second personalizable advertisements and first and second user profiles associated with the respective first and second computing devices may be identified. The second portion of the first personalizable advertisement may be identified based on the first user profile and the second portion of the second personalizable advertisement may be identified based on the second user profile. Outputting an advertisement of the first selection of advertisements may further comprise concurrently outputting the first and second portions of the first personalizable advertisement. Outputting an advertisement of the second selection of advertisements may further comprise concurrently outputting the first and second portions of the second personalizable advertisement.

Receiving the first selection of advertisements may further comprise receiving a first manifest file comprising a link to a second portion of the media content item, a link to an advertisement of the first selection of advertisements and a link to a third portion of the media content item. Receiving the second selection of advertisements may further comprise receiving a second manifest file comprising a link to the second portion of the media content item, a link to an advertisement of the second selection of advertisements and a link to the third portion of the media content item.

In accordance with a second aspect of the disclosure, a method is provided. The method includes identifying a user profile, and generating a media content item for output at a first computing device. A contact is identified based on the user profile and an invitation to join a media content item group session is generated based on the media content item and the identified contact. The invitation is transmitted to a second computing device associated with the contact and an indication that the invitation has been accepted is received. The media content item group session is initiated between the first computing device and the second computing device and the media content item is generated for output at the first computing device and the second computing device.

In an example system, a user logs on to a social media platform via a user profile and consumes a content item. A contact associated with the user profile is identified based on the content item being consumed and an invitation to start a group session to watch the content item is generated. The invitation is sent to the contact, and, on receiving acceptance of the invitation, the group session is initiated, such that the user and the contact watch the content item at the same time.

Generating the invitation may further comprise generating an invitation that expires at an identified expiration time and receiving the indication that the invitation has been accepted may further comprise receiving the indication before the expiration time.

The user profile may be a first user profile. The contact is a first contact, and identifying the contact may further comprise identifying a second user profile associated with the first contact and identifying, via the second user profile, a preference for the media content item. Generating the invitation may further comprise generating the invitation based on the first contact in response to identifying a positive preference for the media content item. In response to identifying a negative preference for the media content item, a second contact may be identified based on the first user profile. A third user profile may be identified with the second contact, a preference for the media content item may be identified via the third user profile, and generating the invitation may further comprise generating the invitation based on the second contact. Identifying a preference for the media content item may further comprise identifying whether the second user profile or the third user profile can receive the media content item.

A timestamp associated with the first user profile and the media content item may be identified and a second user profile associated with the contact may be identified. A progress associated with the media content item may be identified via the second user profile and it may be identified whether the content item comprises a spoiler based on the timestamp and the progress. In response to determining that the content item comprises a spoiler, generating the invitation to join the media content item group session may further comprise generating an invitation that indicates that the media content item comprises a spoiler.

The media content item may be a first media content item, and a second media content item may be received at the second computing device. The received first media content item may be generated for output at the second computing device in a picture-in-picture mode, or in a multi-window configuration.

The media content item may comprise a plurality of portions, and generating the media content item for output may further comprise generating a first portion of the media content item for output. Generating the invitation may further comprise generating the invitation to join a media content item group session for a second portion of the media content item. An invitation output time period may be identified, wherein the end of the time period coincides with the start of the second portion and a request to transmit the invitation to the contact at the beginning of the invitation output time period may be generated for output.

Receiving the indication that the invitation has been accepted may further comprise receiving a request to delay a start time for the media content item group session and generating the request to delay the start time for output. An input associated with accepting the request to delay the start time may be received, and a second invitation comprising a second start time for the media item group session may be generated. The second invitation may be transmitted to the second computing device, and an indication that the second invitation has been accepted may be received.

Identifying the contact may further comprise identifying a second contact, and generating the invitation may further comprise generating an invitation comprising a start time for the media content item group session. Transmitting the invitation may further comprise transmitting the invitation to a third computing device associated with the second contact. It may be identified that an indication that the invitation has been accepted has not been received from the second contact before the start time. In response to the identifying, a second user profile associated with the third contact may be identified, and the media content item may be added to a queue associated with the second user profile.

A viewing schedule associated with the first user profile may be identified, and identifying the contact may be further based on the viewing schedule. Generating the invitation may further comprise generating an invitation based on the viewing schedule, and transmitting the invitation may further comprise transmitting the invitation based on the viewing schedule.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
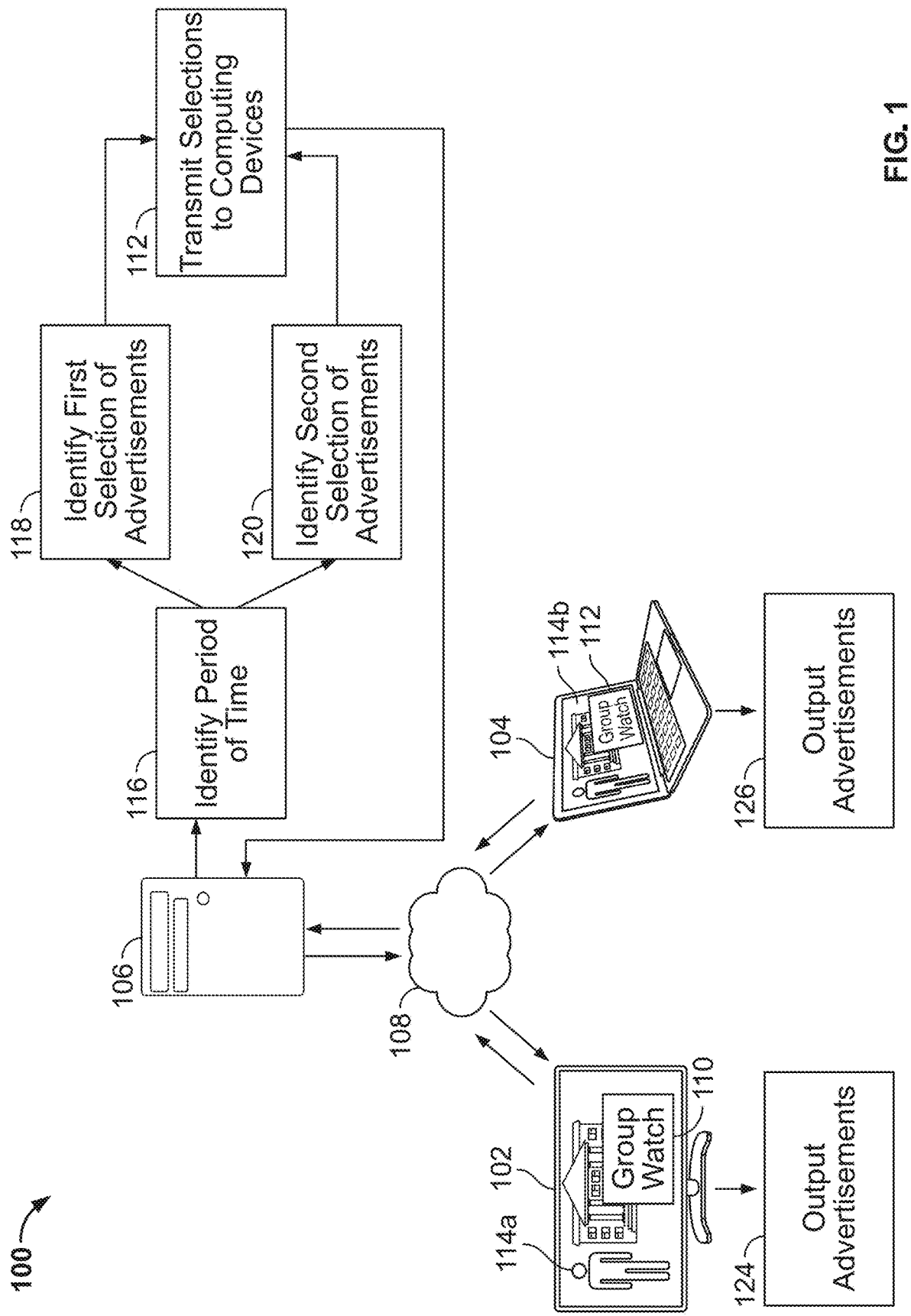
FIG. 1 shows an example environment for enabling advertisement display during a group session, in accordance with some embodiments of the disclosure.

Systems and methods are described herein for enabling an advertisement to be displayed during a group session and/or initiating a media content item group watch session with an identified contact. A media content item, or content item, includes audio, video, text, a video game and/or any other media content. A content item may be a single media item. In other examples, it may be a series (or season) of episodes of content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

A group session, or group watch session, enables a content item to be received and output at participating computing devices at the same time, or substantially the same time. In some examples, a group session may be an audio-only group session, where the content item is an audio book. Any actions, such as pausing and/or fast-forwarding that may be performed at any participating computing device is performed at all of the participants in the group watch session. For example, if one participant pauses the content item, it is paused for all participants. Group watch sessions can take place on a local network, where two or more of the participants are located in a similar area, or the participants can be remote to each other and the group watch session can take place via a network such as the internet. Although the examples discussed herein predominantly discuss group watch sessions comprising two computing devices, a group watch session may comprise any number of computing devices, and all of the examples discussed herein can be implemented on any number of computing devices.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment for enabling advertisement display during a group session, in accordance with some embodiments of the disclosure. The environment 100 comprises a first computing device, in this case smart television 102, a second computing device, in this case laptop 104, and a server 106. The computing devices may be any suitable computing device including, for example, a smartphone and/or a set-top box. The smart television 102, the laptop 104 and the server 106 are in communication via network 108. The network may be any suitable network, including the internet, and may comprise wired and wireless means. A group watch session is initiated at the smart television 102. This may comprise a user interacting with a first group watch user interface element 110 of, for example, an OTT application. On selecting the first user interface element 110, the user may be able to select participants for the group watch session via a list of contacts associated with the OTT platform, in which case an invitation may be sent to a contact via the OTT platform. In another example, the OTT platform may generate a link that may be shared with one or more other users. The link may be shared via the smart television 102 via, for example, a messaging application. In another example, the link may be copied into a messaging application on a further computing device and sent to another user, or users, via the further computing device.

On receiving and selecting the link at a second computing device, the other user, or users, may initiate the group watch session on their computing device via an application associated with the, for example, OTT platform. The invitation may be sent via server 106, which may coordinate the group watch session between participants. In some examples, the group watch session may be between local devices on a single local network, in which case server 106 may not be required and the coordination may be performed directly between the smart television 102 and the laptop 104. In this example, a second group watch user interface element 112 is generated for display at the laptop 104 that enables the user to initiate the session at the laptop 104. On initiating the session, a content item 114, such as an episode of a television show and/or a movie, is transmitted to the smart television 102 and the laptop 104. The content item may be received from server 106, or another server, via network 108. The content item 114a, 114b is output at the smart television 102 and the laptop 104 at the same time, or substantially the same time. Any actions, such as pausing and/or fast-forwarding may be performed at any participating computing device, such as the smart television 102 or the laptop 104 and the action is performed at all of the participants in the group watch session. For example, if one participant pauses the content item, it is paused for all participants.

For a commercial break, during which advertisements are displayed, in the content item, a period of time for the commercial break is identified 116, in this example, at server 106. For example, the run-time of the commercial break may be identified as four minutes and 30 seconds. In other examples, the commercial break may be five seconds, 15 seconds, one minute, three minutes and/or five minutes and 45 seconds. A first selection of advertisements is identified at 118, and a second selection of advertisements is identified at 120. The selections may comprise different numbers of advertisements. A selection may comprise, for example, one, two, five, seven and/or ten advertisements. The first and second selections of advertisements may be received from one or more advertising services, and one or more advertisements within the selection may be personalized for each computing device based on, for example, an advertising profile associated with smart television 102 and the laptop 104, such that different advertisements are delivered to the smart television 102 and the laptop 104. The advertisements are selected based on the run-time of the commercial break, such that the selection of advertisements is equal to the run-time of the commercial break. It is recognized that it may not always be possible to select advertisements that fill the identified time period exactly, and examples for addressing this problem are discussed below. The first and second selections of advertisements are transmitted 122 to the respective smart television 102 and laptop 104, where they are received and output 124, 126. As the run-time of the selections of advertisements is the same, synchronized playback of the content item can resume after the advertisements have been output 124, 126. In this way, personalized advertisements can be delivered to different participants of a group watch session while maintaining synchronized, or substantially synchronized, playback of the content item.

In some examples, in addition to identifying 118, 120 a first and a second selection of advertisements, an advertisement service, or server, may be notified of the formation of a group session and a parent session identification (ID) may be shared with the advertisement service. The parent session ID may include child session IDs, or streaming session IDs, associated with the different participants (e.g., the smart television 102 and the laptop 104) to coordinate the serving and playing of advertisements on the participant devices, as well as to enable accurate audience measurements.

In some examples, an advertisement server may serve creatives for an advertisement, or information about their location, to a manifest manipulation server, but the advertisement server chooses the advertisements within a selection, or pod, such that the total run-time, or playtime, is equal for all the participants of a group session. This allows targeted advertisements to still be served to different participants but ensures that the playback of the main content item is always synchronized across participants. Different advertisements within an advertisement selection can have different time lengths; however, an advertisement selection served to a first user amounts to the same amount of time as the advertisement selection served to a second user.

Figure 2:
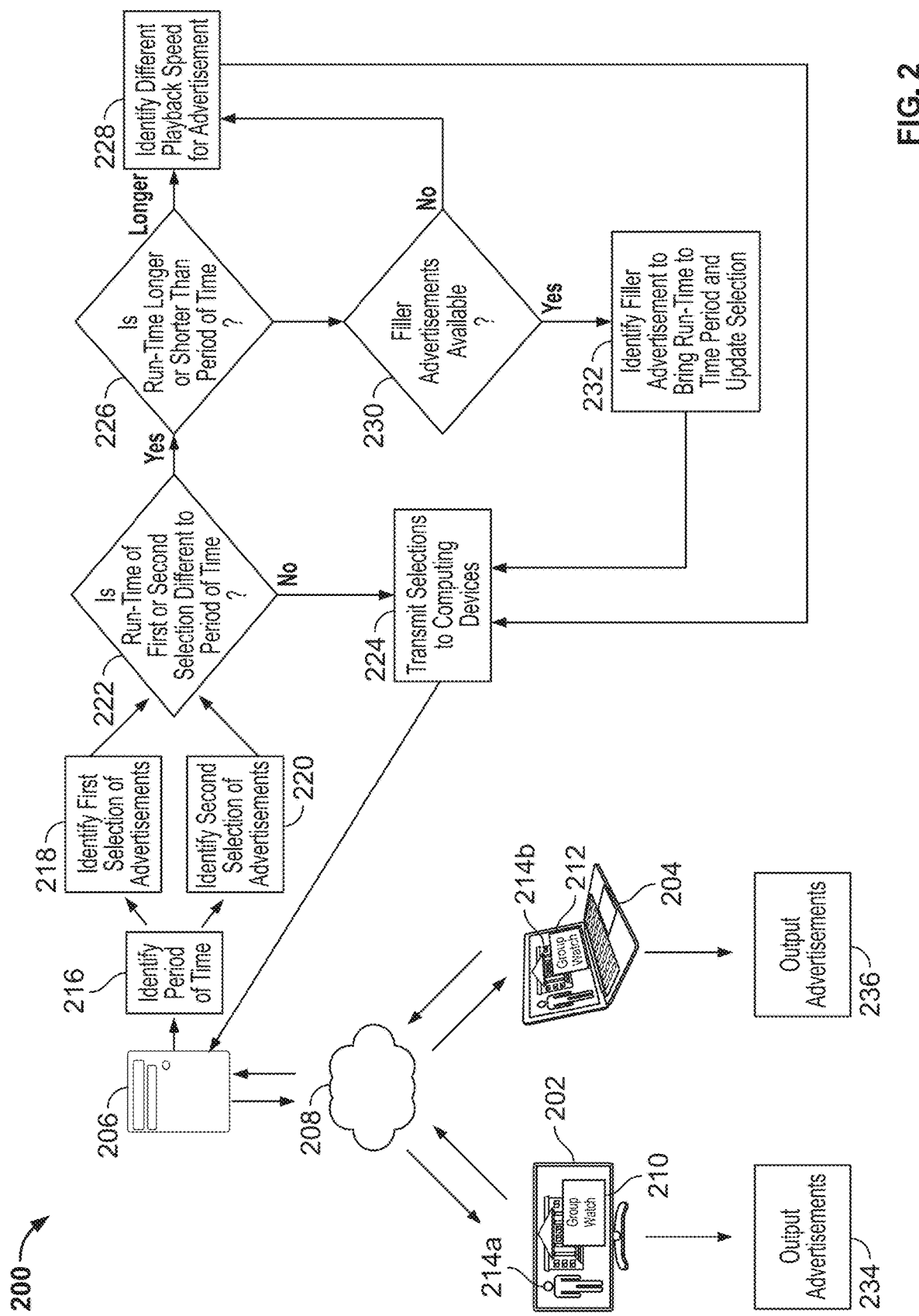
FIG. 2 shows another example environment for enabling advertisement display during a group session, in accordance with some embodiments of the disclosure.

FIG. 2 shows another example environment for enabling advertisement display during a group session, in accordance with some embodiments of the disclosure. In a similar manner to the environment shown in FIG. 1, the environment 200 comprises a smart television 202, a laptop 204 and a server 206 that communicate via network 208. A group watch session is initiated in a similar manner, in this example, via user interface elements 210, 212 and, on initiating the group watch session, a content item 214a, 214b is received and is output at the smart television 202 and the laptop 204. In a similar manner to that described in connection with FIG. 1, a period of time is identified 216 for the commercial break, in this example at server 206. First and second selections of advertisements are identified 218, 220 based on the identified period of time.

At 222, it is identified whether the run-time of the first and/or second selection of advertisements is different from the period of time. If the run-time of the first and/or second selection of advertisements is the same as the identified 216 period of time, the selection of advertisements is transmitted 224 to the respective smart television 202 and/or laptop 204. If the run-time of the first and/or second selection of advertisements is different from the period of time, at 226, it is identified whether the run-time is longer or shorter. If the run-time of the selection is longer, at 228, a different playback speed is identified for at least one advertisement of the selection of advertisements, so that the selection of advertisements fits within the identified 216 period of time.

For example, if the identified period of time is 180 seconds and the run-time of the selection of advertisements is 198 seconds, a playback speed of 1.1× will be identified. Smaller increments of playback speed may also be utilized, for example 1.05× and/or 1.01×. The process proceeds to step 224, where the selection of advertisements and the identified playback speed are transmitted to the respective smart television 202 and/or laptop 204.

If the run-time of the selection is shorter, at 230, it is identified whether filler advertisements are available. If filler advertisements are not available, the process proceeds to step 228 where a different playback speed is identified for at least one advertisement of the selection of advertisements, so that the selection of advertisements fits within the identified 216 period of time. For example, if the identified period of time is 60 seconds and the run-time of the selection of advertisements is 54 seconds, a playback speed of 0.9× will be identified. Smaller increments of playback speed may also be utilized, for example 0.95× and/or 0.99×. If filler advertisements are available, at 232, one or more filler advertisements are identified to bring the run-time of the advertisements to the identified 216 time period and the selection of advertisements is updated. In some examples, the filler advertisement may comprise a single image that has a playtime associated with it. For example, if the original selection of advertisements is four minutes and 57 seconds, and the time period is five minutes, a static image may be added with a time period of three seconds. In some examples, an OTT service may have a selection of filler images based on content items that are available via the service. The updated selection of advertisements is transmitted 224 to the respective smart television 202 or laptop 204. The received selection of advertisements is output 234, 236 at the smart television 202 and laptop 204. As the run-time of the selections of advertisements is the same, synchronized playback of the content item can resume after the advertisements have been output 124, 126. In this way, a selection of personalized advertisements can be identified based on a common time period between group watch participants, and variations in the run-time of the selected advertisements and the common time period can be addressed.

Figure 3:
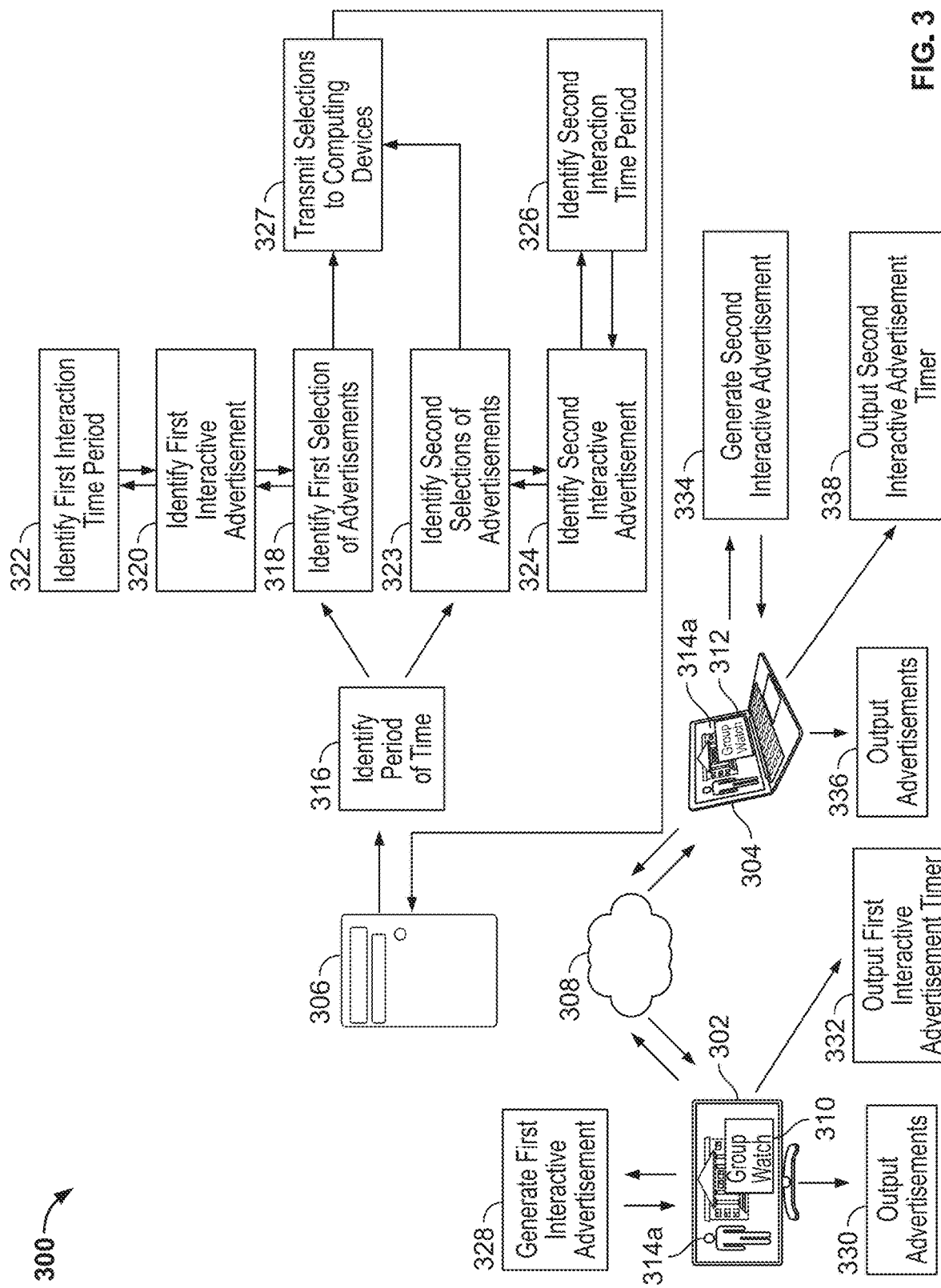
FIG. 3 shows another example environment for enabling advertisement display during a group session, in accordance with some embodiments of the disclosure.

FIG. 3 shows another example environment for enabling advertisement display during a group session, in accordance with some embodiments of the disclosure. In a similar manner to the environment shown in FIGS. 1 and 2, the environment 300 comprises a smart television 302, a laptop 304 and a server 306 that communicate via network 308. A group watch session is initiated in a similar manner, in this example, via user interface elements 310, 312 and, on initiating the group watch session, a content item 314a, 314b is received and is output at the smart television 302 and the laptop 304. In a similar manner to that described in connection with FIG. 1, a period of time is identified 316 for the commercial break, in this example at server 306. First and second selections of advertisements are identified 318, 323 based on the identified period of time.

Identifying 318, 323 the first and second selections of advertisements comprises identifying 320, 324 respective first and second interactive advertisements. In some examples, only one of the first, or second, selections of advertisements comprise an interactive advertisement. The interactive advertisements typically comprise one or more user interface elements that a user can interact with. In some examples, the user interface elements will be overlaid on a static or looped moving image. In order to provide a user time to interact with the user interface elements, while maintaining a predictable run-time for the selection of advertisements, first and second interaction periods are identified 322, 326. The interaction time period is the time that the interactive advertisement is generated for output at a computing device of the group session, for example, the smart television 302 and/or the laptop 304. The selections of advertisements are transmitted 327 to the respective smart television 302 and laptop 304, where they are output 330, 336. In some examples, the interactive advertisement may be generated 328, 334 at the smart television 302 and/or the laptop 304, rather than at the server 306. In another example, a timer may be output 332, 338 with the interactive advertisement, for example, as an overlay, so that a user knows how long they have to interact with the advertisement.

In some examples, a selection of advertisements may comprise both interactive and non-interactive advertisements. In this example, the non-interactive advertisements may be served via server side advertisement insertion and the interactive advertisements may be served via the client side (i.e., at smart television 302 and/or laptop 304). In particular, this example may apply when a decision on which advertisements to serve is performed in real-time, or substantially in real-time, such as during real-time advertisement bidding. In another example, the first selection of advertisements may comprise one or more interactive advertisements and the second selection of advertisements may comprise solely non-interactive advertisements. The interaction time, or total interaction times, associated with each of the one or more interactive advertisements of the first selection may be based on, or equal to, the run time of an advertisements, or advertisements of the second selection. In one example, the first selection of advertisements may comprise a single interactive advertisement and the second selection of advertisements may comprise a plurality of non-interactive advertisements. In this example, the interaction time associated with the single interactive advertisement may be equal to the run-time of the plurality of non-interactive advertisements.

Figure 4:
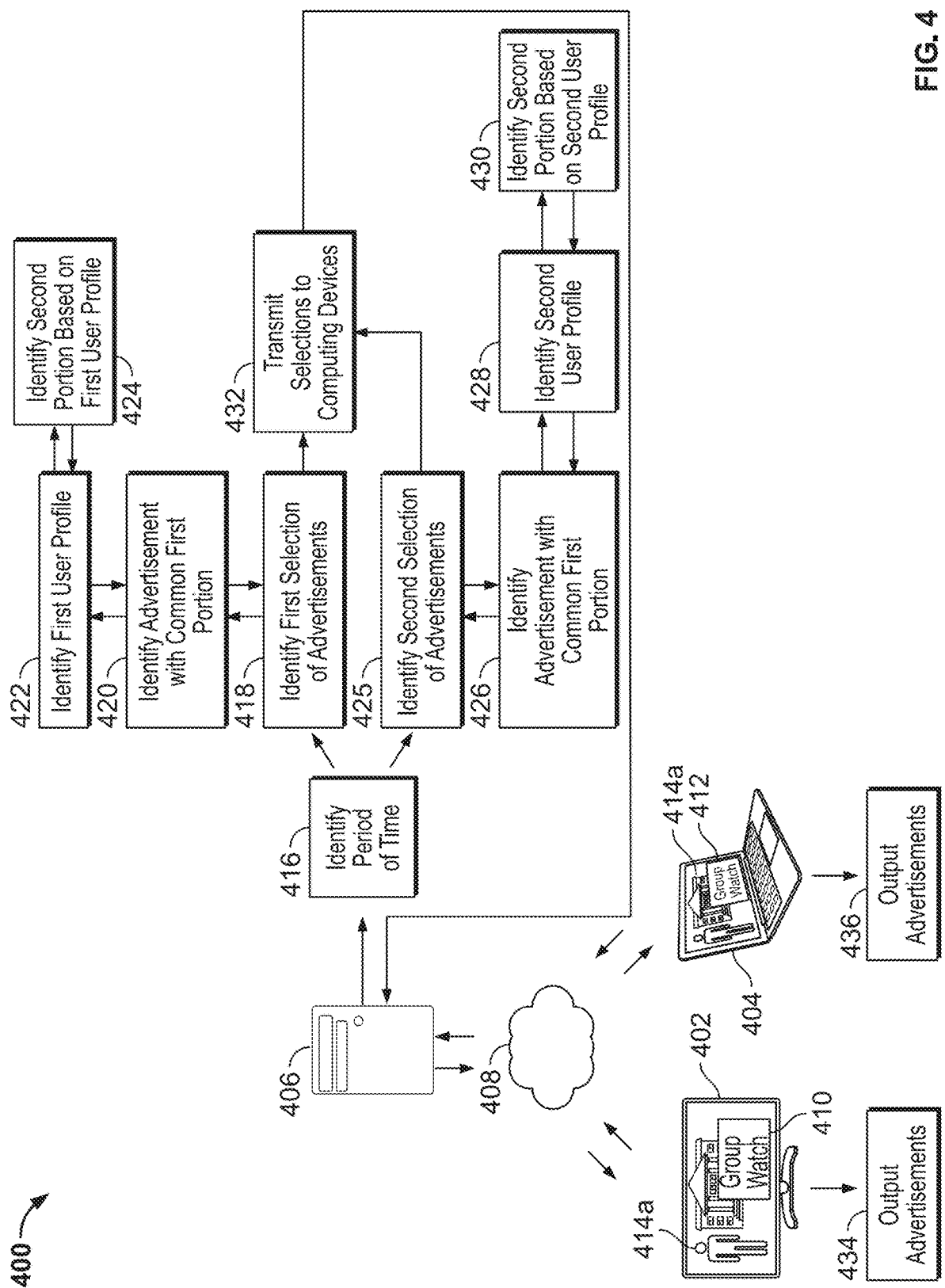
FIG. 4 shows another example environment for enabling advertisement display during a group session, in accordance with some embodiments of the disclosure.

FIG. 4 shows another example environment for enabling advertisement display during a group session, in accordance with some embodiments of the disclosure. In a similar manner to the environment shown in FIGS. 1-3, the environment 400 comprises a smart television 402, a laptop 404 and a server 406 that communicate via network 408. A group watch session is initiated in a similar manner, in this example, via user interface elements 410, 412 and, on initiating the group watch session, a content item 414a, 414b is received and is output at the smart television 402 and the laptop 404. In a similar manner to that described in connection with FIG. 1, a period of time is identified 416 for the commercial break, in this example at server 406. First and second selections of advertisements are identified 418, 425 based on the identified period of time.

Identifying 418, 425 the first and second selections of advertisements comprises identifying 420, 426 respective first and second advertisements with a common first portion. First and second user profiles, associated with the, for example, smart television 402 and laptop 404, are identified 422, 428 and second portions of the first and second advertisements with a common first portion are identified 424, 430. In some examples, only a subset of a group watch session receives advertisements with a common first portion. In some examples, this may be based on user profiles associated with the participants having a common advertisement indicator, such as having travelled to the same location recently. An example of an advertisement having a common first portion and different second portions is an advertisement for a travel agency that advertises different vacations based on the user profiles. The first portion, for the travel agency, may be common between the participants, but the advertised vacation may be different. Both the first and second portions may be output concurrently. For example, the first portion may be a background portion of the advertisement and the second portion may be a foreground portion of the advertisement. In another example, an advertisement may be for a chain of supermarkets and a first portion advertising the chain of supermarkets may be common between participants, but a second portion that indicates a local supermarket of the chain may be different for each participant based on, for example, a location associated with a user profile. Again, both the first and second portions may be output concurrently. Similarly, for example, the first portion may be a background portion of the advertisement and the second portion may be a foreground portion of the advertisement. The second portions of the advertisements may comprise different video and/or audio from one another. The first and second selections of advertisements are transmitted 432 to the respective smart television 402 and laptop 404, where they are output 434, 436.

Figure 5:
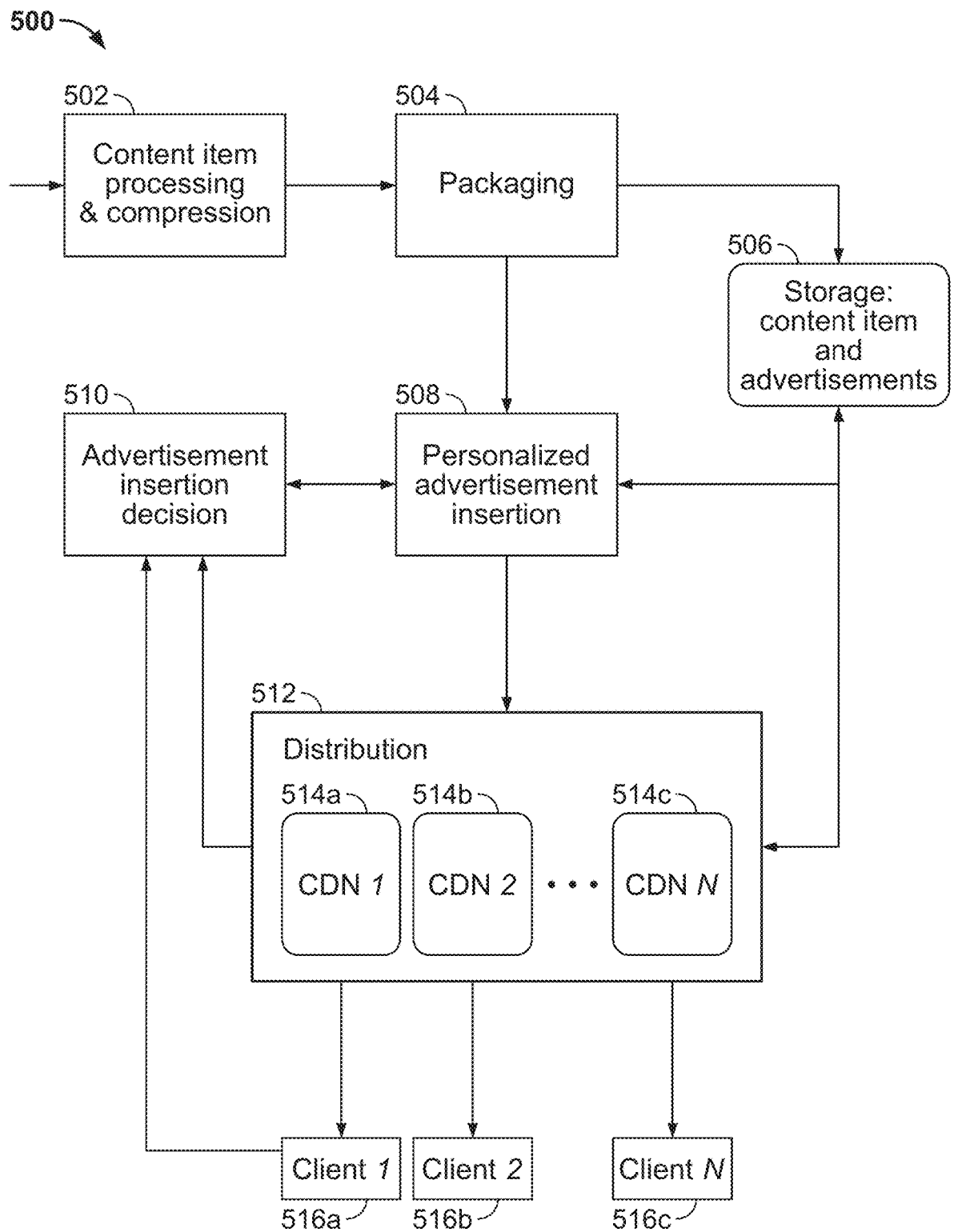
FIG. 5 shows another example environment for enabling advertisement display during a group session, in accordance with some embodiments of the disclosure.

FIG. 5 shows another example environment for enabling advertisement display during a group session, in accordance with some embodiments of the disclosure. The environment 500 comprises a content item processing and compression module 502, a packaging module 504, a storage module 506, a personalized advertisement insertion module 508, an advertisement insertion decision module 510, a distribution service module 512, a plurality of content delivery network (CDN) servers 514a, 514b, 514c and a plurality of clients, i.e., computing devices, 516a, 516b, 516c. The content item is received at the content item processing and compressing module, where it is processed and compressed for delivery to group session participants. The processed and compressed content item is transmitted to the packaging module 504, where it is packaged for transmission to participants of a group session. The packaged content item is transmitted to a storage module, for example a cloud storage module, at 506, where it is retrievable on demand, along with a selection of advertisements. The distribution service 512 accesses the storage 506 and receives the packaged content item for distribution to the plurality of CDN servers 514a, 514b, 514c. The distribution service 512 delivers the media content item via the CDN servers 514a, 514b, 514c to the plurality of clients, i.e., computing devices, 516a, 516b, 516c. The advertisement insertion decision module 510 decides to insert one or more advertisements in a group session and communicates this decision to the personalized advertisement insertion module 508, which selects the advertisements to be inserted for each client 516a, 516b, 516c. The advertisements are retrieved from storage 506 and are transmitted to the clients 516a, 516b, 516c via the distribution service, in the manner described in connection with FIGS. 1-4 above.

Figure 6:
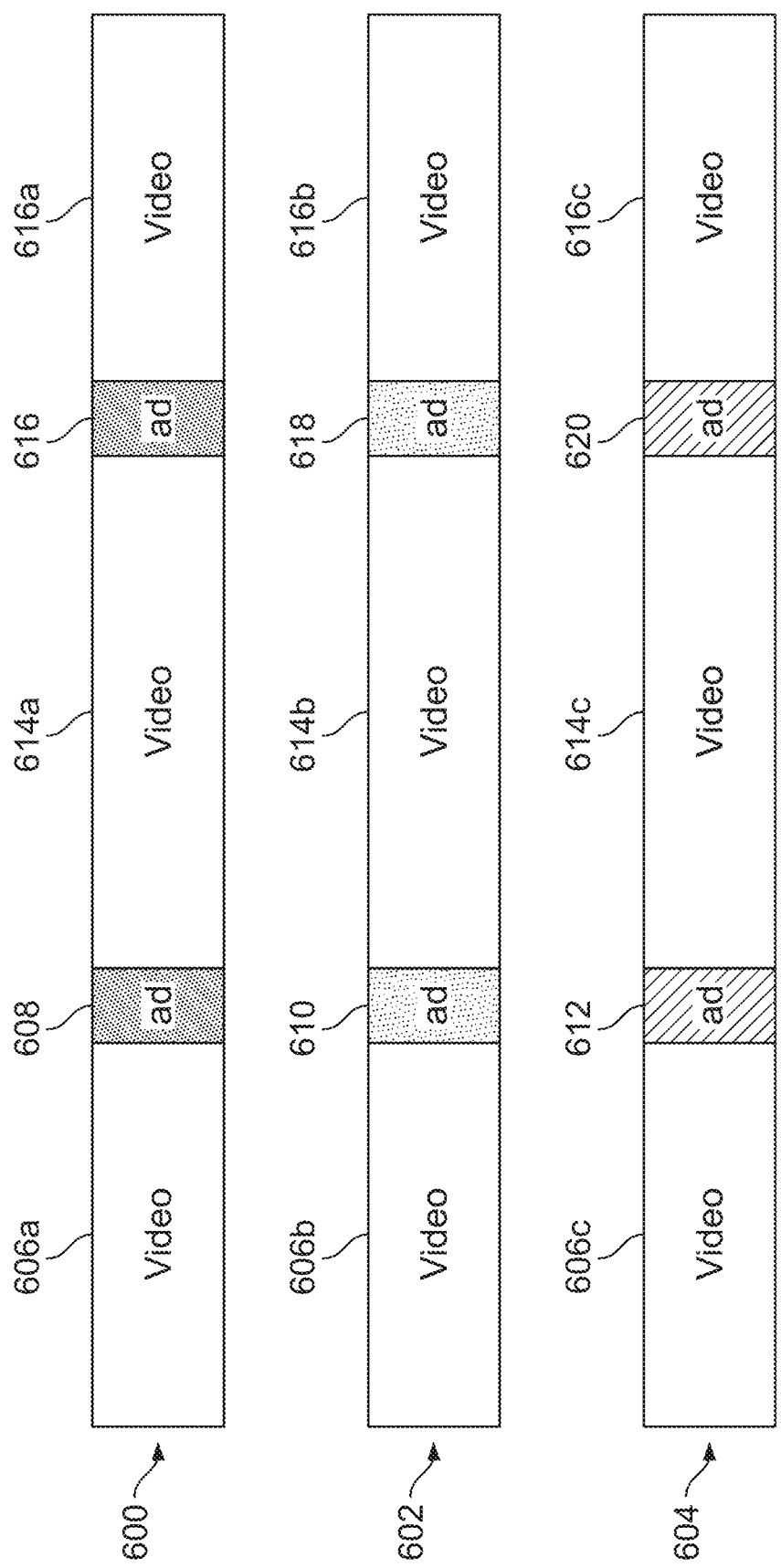
FIG. 6 shows another example environment for enabling advertisement display during a group session, in accordance with some embodiments of the disclosure.

FIG. 6 shows another example environment for enabling advertisement display during a group session, in accordance with some embodiments of the disclosure. FIG. 6 shows three schematic manifest files 600, 602, 604 for enabling synchronized, or substantially synchronized, playback of a content item and advertisements during a group session. The length of the depicted video and advertisement segments indicates a run-time associated with each segment. The manifest files 600, 602, 604 each comprise first segments 606a, 606b, 606c of video, each being the same segment of video and having a common run-time, and a first advertisement 608, 610, 612, each being a different advertisement, but having a common run-time. In a similar manner, the manifest files 600, 602, 604 each comprise second segments 614a, 614b, 614c of video, each being the same segment of video and having a common run-time, and a second advertisement 616, 618, 620, each being a different advertisement, but having a common run-time. The manifest files 600, 602, 604 each comprise third segments 614a, 614b, 614c of video, each being the same segment of video and having a common run-time. In some examples, the various advertisements may be associated a unique device identification and/or session identification so that a manifest manipulation service can incorporate the advertisements in the corresponding manifest before sending the manifest to a computing device.

Figure 7:
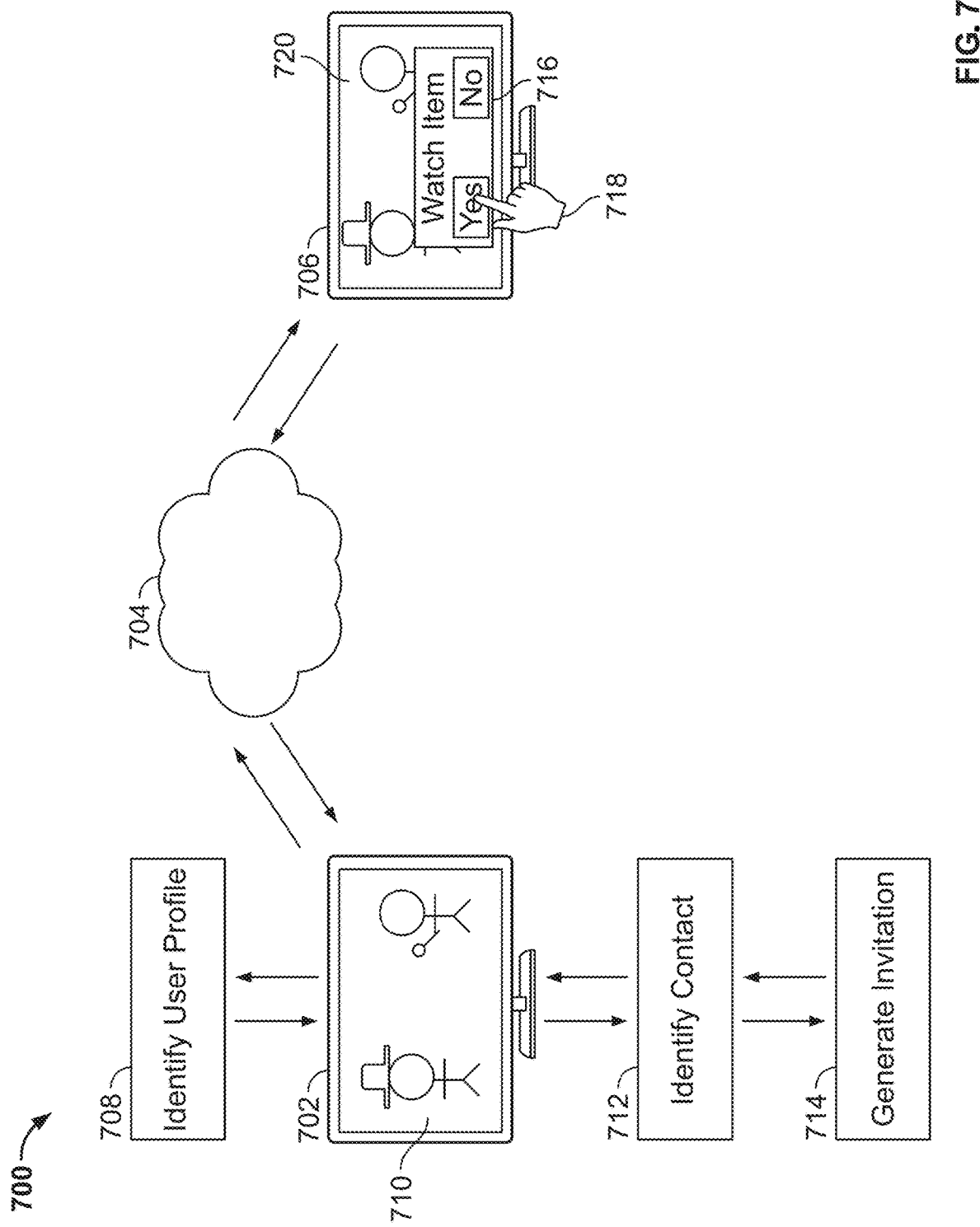
FIG. 7 shows an example environment for initiating a media content item group watch session with an identified contact, in accordance with some embodiments of the disclosure.

FIG. 7 shows an example environment for initiating a media content item group watch session with an identified contact, in accordance with some embodiments of the disclosure. The environment 700 comprises a first computing device, in this example first tablet 702, that is connected via network 704 to a second computing device, in this example, second tablet 706. The network 704 may be any suitable network, such as the internet, and may comprise wired and/or wireless means. A user profile is identified 708 at the first tablet 702. The user profile may be any suitable user profile, for example, a user profile associated with a social media platform, and/or video-sharing platform. A content item 710, such as an episode of a television series and/or a movie, is received at the first tablet 702. The content item 710 may be received via the network 704, from a server (not shown). A contact is identified 712 based on the user profile and the content item. For example, a plurality of contacts may be associated with the user profile and it may be identified that the user has watched an earlier episode of the series of programs with the contact.

On identifying the contact, an invitation to watch the content item with the identified contact is generated 714. In some examples, this invitation may comprise a recommendation. A user interface element associated with the invitation may be output at the tablet 702, for example, a request to transmit the invitation to the contact. In another example, the identifying 712 the contact and generating 714 the invitation may be performed in response to input received at a user interface element associated with initiating a group session. In some examples, the invitation may automatically be transmitted to the contact. In a further example, generating the invitation may comprise generating a link to transmit to the contact via a messaging application running on the first tablet 702 and/or another computing device. On transmitting the invitation to the contact, typically via network 704, a user interface element 716 is generated for output at the second tablet 706 associated with the contact. In some examples, the user interface element may comprise receiving a link via a messaging application. The user interface element 716 enables input 718 to be received for accepting the invitation. In some examples, the user interface element 716 also enables input to be received for declining the invitation. On receiving an acceptance of the invitation, an indication is transmitted to the first laptop 702 and a group session is initiated, such that the content item 710, 720 is received and generated for output at the first tablet 702 and the second tablet 706 at the same time, or substantially the same time. In some examples, the content item may revert to the start of the content item. In other examples, the content item may resume from a timestamp of the content item associated with when the invitation was generated and transmitted to the identified contact. In this way, a watch session based on a pre-defined portion of a content item can be initiated, for example, if the user watches a portion of a content item and believes that a friend would be interested in watching it too.

In some examples, the contact may be identified via a number of different ways, and the invitation may comprise a recommendation for content. For example, it may be determined that a contact was recommended a show that the user is already watching based on, for example, a high connection, or friendship, score. The invitation may comprise a recommendation to watch a portion of a content item, which may, in turn, increase the contact's interest in the content item. In another example, the contact might have started watching a content item and subsequently stopped watching the content item. The invitation may be based on the time that the contact stopped watching the content item to entice the contact to resume watching the content item. Additionally, this feature can be used to prime the contact for a subsequent recommendation. For example, the user may be watching content that a contact might be interested in, while the contact is finishing watching a different content item. This would allow a recommendation of a new content item to the contact through the user. All these techniques and features can be used to retain subscribers as well as to promote new content items and enable users to discover content through each other.

In one example, a social module that is integrated with a media player (or that has access to the player) can recommend to a contact watching a particular portion of the content (e.g., while the user is viewing the content item). Such recommendation can be made based on the contact's profile (content preferences), and availability (e.g., that the contact is online) and/or connection strength score between the user and a contact. As such, the user can accept a recommendation to invite a contact (or contacts) to a group session, in which case an invitation is sent to the contact with an option to accept or decline. Other parameters can be considered as well, for example, if one or more content restrictions are associated with the contact's profile. For example, content restrictions may be based on a type or genre of a portion of the content. In another example, content restrictions may be based on whether the portion of the content is appropriate for the contact. These features are discussed in more detail below.

Figure 8:
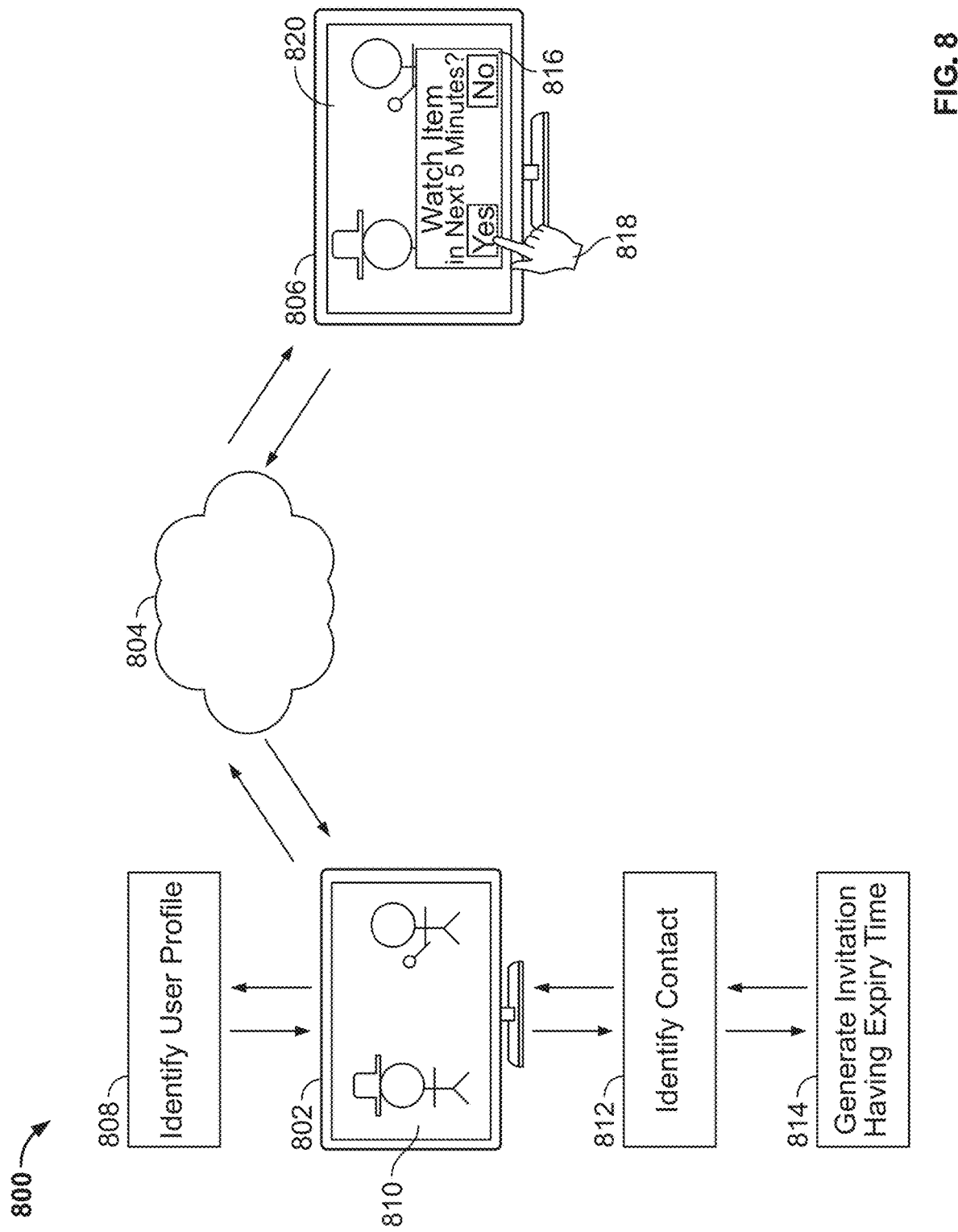
FIG. 8 shows another example environment for initiating a media content item group watch session with an identified contact, in accordance with some embodiments of the disclosure.

FIG. 8 shows another example environment for initiating a media content item group watch session with an identified contact, in accordance with some embodiments of the disclosure. In a similar manner to the environment shown in FIG. 7, the environment 800 comprises a first tablet 802, a network 804 and a second tablet 806. A user profile is identified 808 at the first tablet 802. A content item 810 is received at the first tablet 802. A contact is identified 812 based on the user profile and the content item. On identifying the contact, an invitation, comprising an expiry time, to watch the content item with the identified contact is generated 814. For example, the expiry time may be five minutes. In other examples, the expiry time may be 30 seconds, two minutes and/or seven minutes. In some examples, the expiry time may be generated based on an online status, or a last-seen status, of a contact. The invitation is transmitted to the contact, typically via network 804, and a user interface element 816 is generated for output at the second tablet 806 associated with the contact. The user interface element 816 indicates the expiry time and enables input 818 to be received for accepting the invitation. On receiving an acceptance of the invitation within the expiry time, an indication is transmitted to the first laptop 802 and a group session is initiated, such that the content item 810, 820 is received and generated for output at the first tablet 802 and the second tablet 806 at the same time, or substantially the same time. If a user input associated with accepting the invitation is not received within the expiry time, the invitation expires and, for example, the user interface element is no longer output for display.

Figure 9:
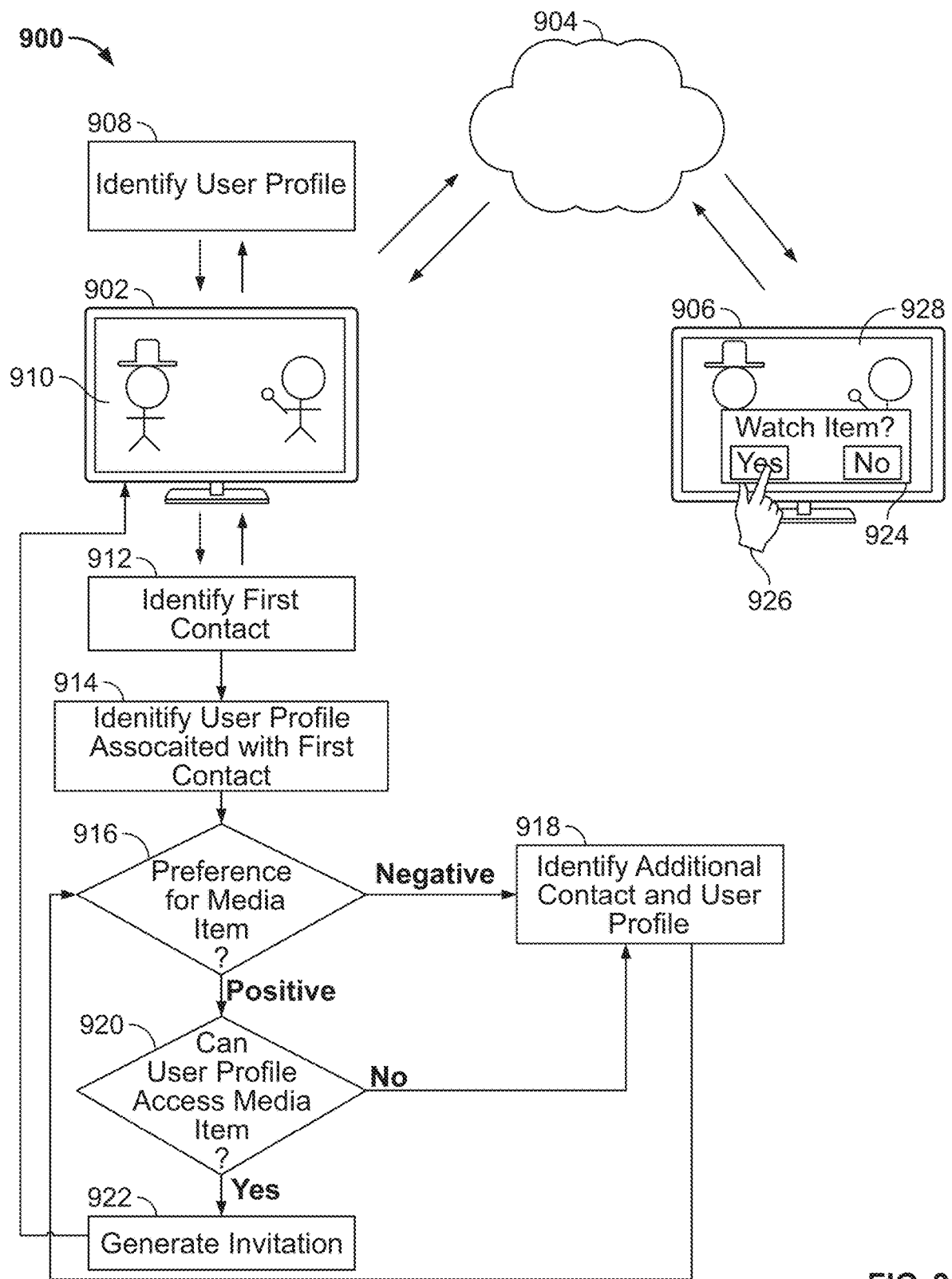
FIG. 9 shows another example environment for initiating a media content item group watch session with an identified contact, in accordance with some embodiments of the disclosure.

FIG. 9 shows another example environment for initiating a media content item group watch session with an identified contact, in accordance with some embodiments of the disclosure. In a similar manner to the environment shown in FIGS. 7 and 8, the environment 900 comprises a first tablet 902, a network 904 and a second tablet 906. A user profile is identified 908 at the first tablet 902. A content item 910 is received at the first tablet 902. A contact is identified 912 based on the user profile and the content item. A second user profile that is associated with the first contact is identified 914 and, based on the second user profile, a preference for the content item is identified at 916. For example, the content item may be a comedy content item, and the second user profile may indicate that the user has a preference for comedy. In another example, the second user profile may indicate that the user does not like comedy items. If the preference for the content item is negative, an additional contact and user profile is identified at 918 and the process loops back to step 916.

If the preference for the content item is positive, it is identified whether the user profile can access the content item at 920. For example, the content item may require a subscription to a particular OTT service, or may have a particular age limit associated with it. If the user profile is unable to access the content item, for example they are not subscribed to a particular OTT service or an age associated with the user is too young for the content item, the process proceeds to step 918, where an additional contact and user profile is identified. If the user profile can access the content item, the process proceeds to step 922, where an invitation to watch the content item with the identified contact is generated 922. The invitation is transmitted to the contact, typically via network 904, and a user interface element 924 is generated for output at the second tablet 906 associated with the contact. The user interface element 924 enables input 926 to be received for accepting the invitation. On receiving an acceptance of the invitation, an indication is transmitted to the first laptop 902 and a group session is initiated, such that the content item 910, 928 is received and generated for output at the first tablet 902 and the second tablet 906 at the same time or substantially the same time.

In some examples (not shown), at step 920, if the user cannot access the content item, the process proceeds to step 922 and an invitation is generated comprising an invitation to, for example, subscribe to an OTT service so that they can access the content item. In some examples, the invitation may comprise a referral link that confers a benefit, such as credit, the user profile associated with transmitting the invitation.

Figure 10:
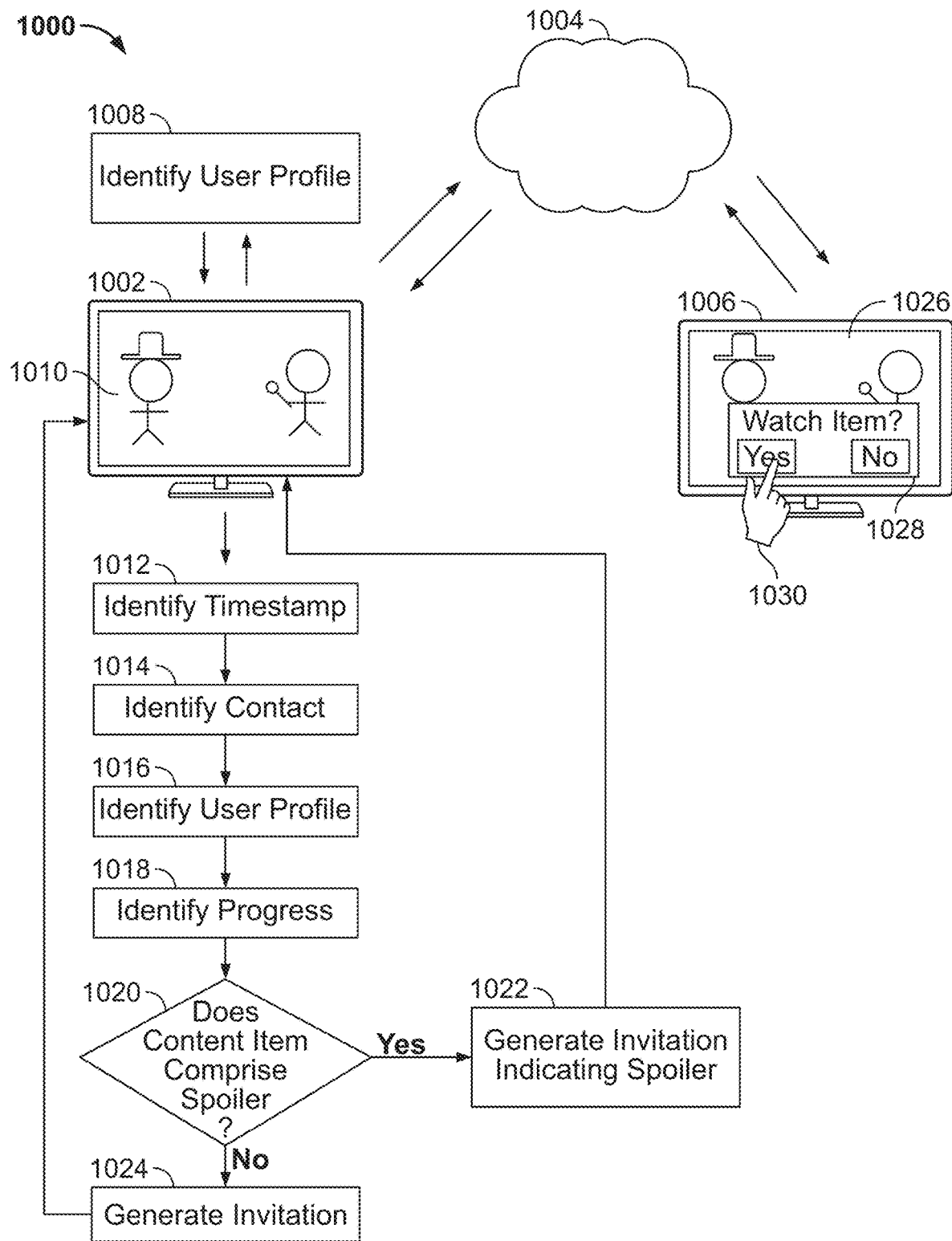
FIG. 10 shows another example environment for initiating a media content item group watch session with an identified contact, in accordance with some embodiments of the disclosure.

FIG. 10 shows another example environment for initiating a media content item group watch session with an identified contact, in accordance with some embodiments of the disclosure. In a similar manner to the environment shown in FIGS. 7-9, the environment 1000 comprises a first tablet 1002, a network 1004 and a second tablet 1006. A user profile is identified 1008 at the first tablet 1002. A content item 1010 is received at the first tablet 1002. At 1012, a timestamp associated with the content item is identified, for example, a current playback time of the content item. In some examples, the timestamp may be a short period, such as five seconds, before the current playback time of the content item. At 1014, a contact is identified based on the user profile and the content item. At 1016, a second user profile, associated with the contact, is identified, and, at 1018, a progress through the content item associated with the second user profile is identified. For example, if the content item is a series of television programs, it may be identified that the second user profile has consumed up to episode 3, season 2 of the series of television programs. At 1020, based on the progress, it is identified whether the content item that is being consumed at the first tablet 1002 comprises a spoiler. For example, if the content item being consumed at the first tablet 1002 is episode 6, season 3, it may comprise a spoiler. In another example, if the content item being consumed at the first tablet 1002 is episode 1, season 2, then it will not comprise a spoiler. If it is identified that the content item comprises a spoiler, at 1022, an invitation to watch the content item indicating that the content item comprises a spoiler is generated. If it is identified that the content item does not comprise a spoiler, at 1024, an invitation to watch the content item with the identified contact is generated. The invitation is transmitted to the contact, typically via network 1004, and a user interface element 1028 is generated for output at the second tablet 1006 associated with the contact. The user interface element 1028 enables input 1030 to be received for accepting the invitation. On receiving an acceptance of the invitation, an indication is transmitted to the first laptop 1002 and a group session is initiated, such that the content item 1010, 1026 is received and generated for output at the first tablet 1002 and the second tablet 1006 at the same time, or substantially the same time.

Figure 11:
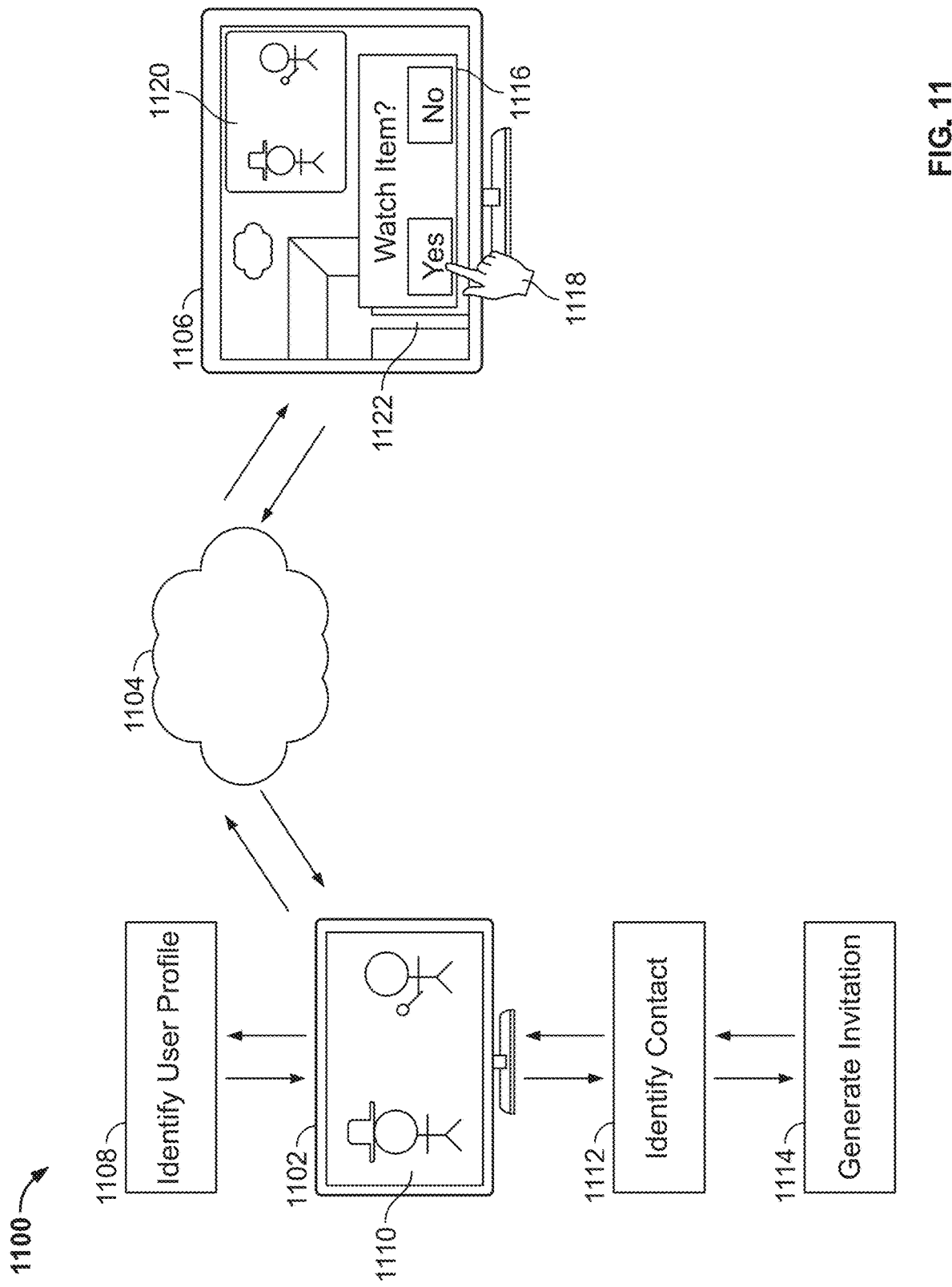
FIG. 11 shows another example environment for initiating a media content item group watch session with an identified contact, in accordance with some embodiments of the disclosure.

FIG. 11 shows another example environment for initiating a media content item group watch session with an identified contact, in accordance with some embodiments of the disclosure. In a similar manner to the environment shown in FIGS. 7-10, the environment 1100 comprises a first tablet 1102, a network 1104 and a second tablet 1106. A user profile is identified 1108 at the first tablet 1102. A content item 1110 is received at the first tablet 1102. A contact is identified 1112 based on the user profile and the content item. On identifying the contact, an invitation to watch the content item with the identified contact is generated 1114. The invitation is transmitted to the contact, typically via network 1104, and a user interface element 1116 is generated for output at the second tablet 1106 associated with the contact. In this example, a second content item 1122 is being output at the second tablet 1106. The user interface element 1116 enables input 1118 to be received for accepting the invitation. On receiving an acceptance of the invitation, an indication is transmitted to the first laptop 1102 and a group session is initiated, such that the content item 1110, 1120 is received and generated for output at the first tablet 1102 and the second tablet 1106 at the same time, or substantially the same time. In this example, as a second content item 1122 is being consumed at the second tablet 1106, the first content item 1120 is displayed in a picture-in-picture (PiP) mode at the second tablet 1106. In some examples, the second tablet 1106 may automatically display the first content item 1120 in PiP mode on detection of a second content time being consumed at the second tablet. In other examples, a group session content item may be displayed in a PiP mode in response to a setting being set at the second tablet 1106, for example, a setting associated with an OTT application. In other examples, instead of displaying the first content item 1120 in a PiP mode, the second tablet 1106 may automatically initiate a link with a third computing device, for example via Bluetooth and/or Wi-Fi, such that the group session is initiated at the third computing device.

The invitation to watch may be presented on the second tablet 1106 while content is already being consumed. The user of the second tablet 1106 can play the suggested portion of the content item in PiP mode. In another example, they may consume the suggested content item in full screen and the second content item that was being consumed at the second tablet 1106 may be paused. At the end of the playing the shared content item, the content that was being consumed at the second tablet 1106 may automatically resume playing if it got paused, or may go back to full screen if it was switched to PiP mode.

Figure 12:
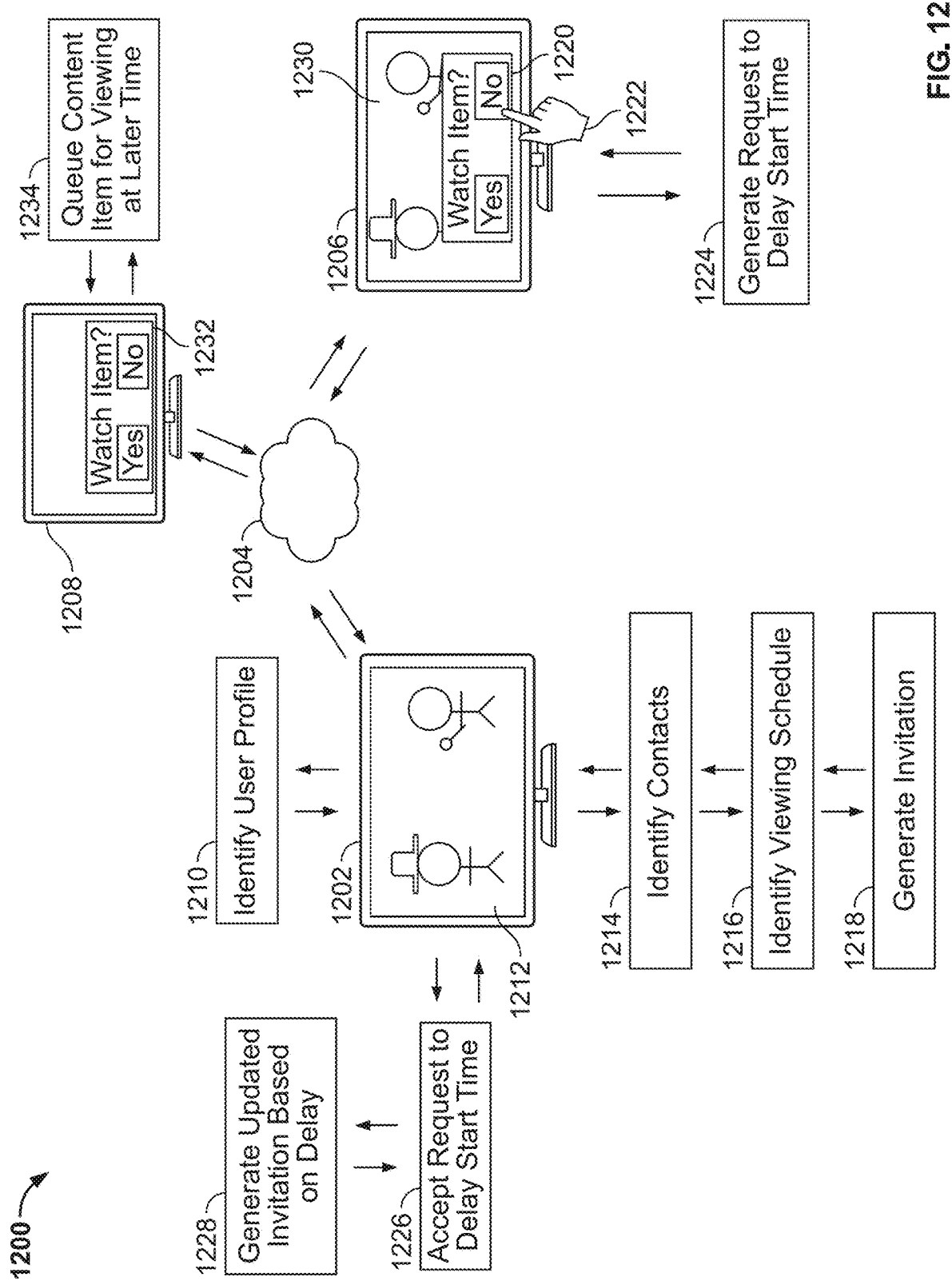
FIG. 12 shows another example environment for initiating a media content item group watch session with an identified contact, in accordance with some embodiments of the disclosure.

FIG. 12 shows another example environment for initiating a media content item group watch session with an identified contact, in accordance with some embodiments of the disclosure. In a similar manner to the environment shown in FIGS. 7-11, the environment 1200 comprises a first tablet 1202, a network 1204, a second tablet 1206 and a third tablet 1208. A user profile is identified 1210 at the first tablet 1202. A content item 1212 is received at the first tablet 1202. Contacts are identified 1214 based on the user profile and the content item. On identifying the contacts, a time period based on a portion of the content item is identified 1216. For example, if the content item comprises a plurality of chapters and the second chapter is being consumed, the time period may be based on the time until the start of the third chapter. An invitation, based on the identified time period, to watch the content item with the identified contact is generated 1218. For example, the invitation may comprise an indication to transmit it closer to the start of the third chapter. The invitation is transmitted to the contacts, typically via network 1204, and user interface elements 1220, 1232 are generated for output at the second and third tablets 1206, 1208 associated with the contacts. The user interface element 1220 enables input 1222 to be received for accepting the invitation. In this example, the user declines the invitation and generates 1224, via a user interface element, a request to delay the start time of the group session. This request is transmitted to the first tablet 1202, where it is accepted 1226, via a user interface element, and an updated invitation is generated 1228 based on the delay. The updated invitation is transmitted to the second and third tablets 1206, 1208, where it is accepted via a user interface element at the second tablet. No input is received at the third tablet 1208 and the content item is queued 1234 for consuming at a later time, though not via a group session. On receiving an acceptance of the invitation at the second tablet 1206, an indication is transmitted to the first laptop 1202 and a group session is initiated, such that the content item 1212, 1230 is received and generated for output at the first tablet 1202 and the second tablet 1206 at the same time, or substantially the same time.

Automatic invitations to a group session may be sent out if certain criteria are met. For example, a user can designate which contact, or contacts, can be automatically invited. Future recommendations for inviting contacts may be based on a contact accepting the invitation and/or ranking the content item, for example, with a thumbs up. In some examples, future recommendations may be based on the contact being invited to a group session for a portion of a content item and watching a remaining portion of the content item and/or restarting the content item from the beginning.

If the group session includes more than two participants, then a timer may be initiated when one of the participants accepts the invitation. This enables playback of the portion of the content item after a period of time (e.g., 30 seconds) if the other participants do not accept the invitation within that time. Additionally, this will ensure synchronous viewing, since the invitation to watch the content item with the other participants expires after the predetermined period of time; however, the content item may still be available for consumption.

In one example, a participant may request a new start time of the watch party, and this may be confirmed and administered by the participant who initiated the invitation. In response to the delay being accepted, the addition may be prompted (e.g., as shown in a timer associated with accepting the invitation) to all the participants, not just those who have accepted the invitation. In one example, a preview of the shared content item is queued (for later viewing) if one or more of the participants did not respond to the invitation to watch. This may comprise a free preview that can be subject to content restriction (just like the main content item) or can be subject to different types of restrictions (e.g., can be shared with more users, watched for a limited time, etc.). The free preview can enable a user to watch the whole content item, or can be associated with a digital coupon to rent the content item at a discount and/or watch with advertisements.

Figure 13:
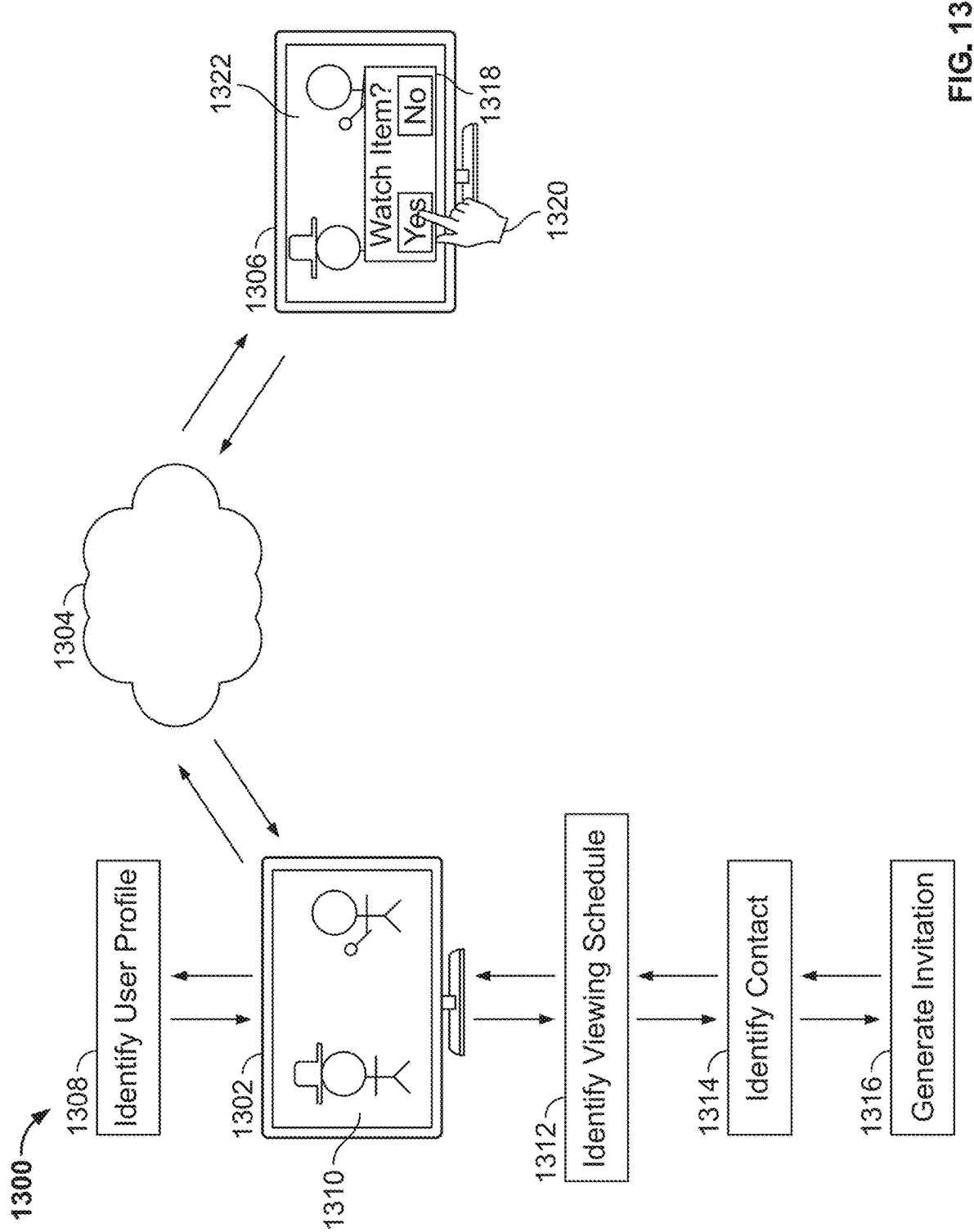
FIG. 13 shows another example environment for initiating a media content item group watch session with an identified contact, in accordance with some embodiments of the disclosure.

FIG. 13 shows another example environment for initiating a media content item group watch session with an identified contact, in accordance with some embodiments of the disclosure. In a similar manner to the environment shown in FIGS. 7-12, the environment 1300 comprises a first tablet 1302, a network 1304 and a second tablet 1306. A user profile is identified 1308 at the first tablet 1302. A content item 1310 is received at the first tablet 1302. A viewing schedule 1312 associated with the user profile 1308 is identified. For example, it may be identified that a user associated with the user profile consumes an episode of a series at 5:00 pm every Tuesday. A contact is identified 1314 based on the user profile, the content item and the viewing schedule. For example, it may be identified that the contact also consumes an episode of the same series at 5:00 pm every Tuesday. In other examples, there may be variation around, for example, the start time of viewing. A contact may start consuming the content item, for example, 15 minutes before, or after, the user associated with the user profile. On identifying the contact, an invitation to watch the content item with the identified contact is generated 1316. The invitation is transmitted to the contact, typically via network 1304. In some examples, the invitation may be transmitted substantially before the start time of the content item and may be added to, for example, a calendar associated with the contact. A user interface element 1318 is generated for output at the second tablet 1306 associated with the contact. The user interface element 1316 enables input 1318 to be received for accepting the invitation. In some examples, the user interface element 1318 is generated in response to a calendar item. On receiving an acceptance of the invitation, an indication is transmitted to the first laptop 1302 and a group session is initiated, such that the content item 1310, 1322 is received and generated for output at the first tablet 1302 and the second tablet 1306 at the same time, or substantially the same time.

It can be determined ahead of time, for example, based on data, or information, from a social media service, or component, which portions of a content item to recommend sharing and/or with whom to share. The signaling for such feature can occur within a manifest delivered to a media player; however, other signaling mechanisms (outside of the manifest) are also contemplated and include, for example, application programming interface (API) calls between a social application and an OTT application.

An advertisement-supported short watch party may serve as a means for sharing short form video. This is essentially a form of asynchronized watch party. When implemented, this enables users to post a short form video, for example via a sharing link, which can be consumed by others in either a synchronized or asynchronized manner. In this example, there is no need to re-create content from longer versions as those short portions are already available. Users, in general, have access to advertisement-supported services, which in return can serve as a platform for content posting and sharing. This creates opportunities for advertising to reach more audiences, through various ways of consuming the content.

Figure 14:
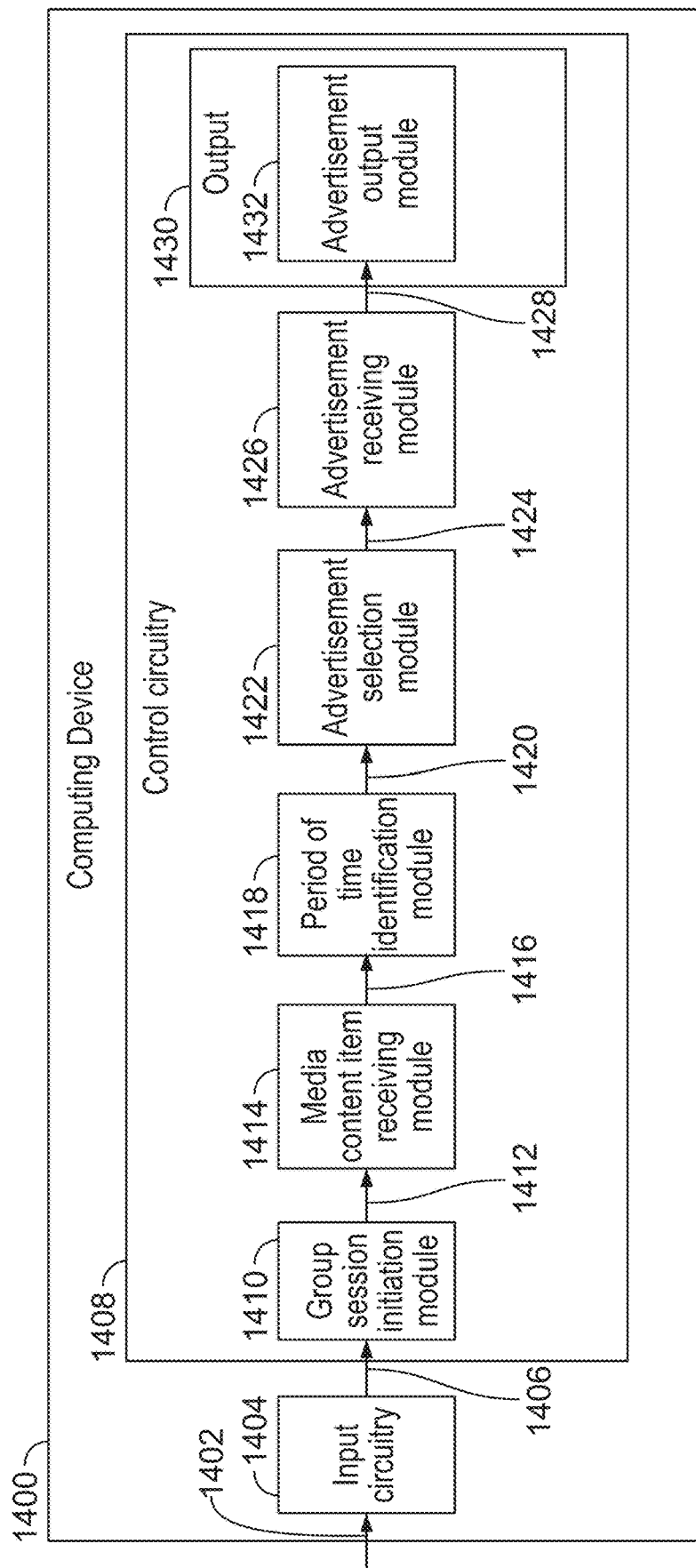
FIG. 14 shows a block diagram representing components of a computing device and dataflow therebetween for enabling advertisement display during a group session, in accordance with some embodiments of the disclosure.

FIG. 14 shows a block diagram representing components of a computing device and dataflow therebetween for enabling advertisement display during a group session, in accordance with some embodiments of the disclosure. Computing device 1400 (e.g., computing device 102, 202, 302, 402, 702, 802, 902, 1002, 1102, 1202, 1302), as discussed above, comprises input circuitry 1404, control circuitry 1408 and output circuitry 1430 Control circuitry 1408 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1402 by the input circuitry 1404. The input circuitry 1404 is configured to received inputs related to a computing device. For example, this may be via a touchscreen, a keyboard, a mouse and/or a microphone in communication with the computing device 1400. In other examples, this may be via a gesture detected via an augmented, mixed and/or virtual reality device. In another example, the input may comprise instructions received via another computing device, for example, a smart speaker. The input circuitry 1404 transmits 1406 the user input to the control circuitry 1408.

The control circuitry comprises a group session initiation module 1410, a media content item receiving module 1414, a period of time identification module 1418, an advertisement selection module 1422, an advertisement receiving module 1426 and an output module 1430 comprising an advertisement output module 1432. The input is transmitted 1406 to the group session initiation module 1410, where a group session is initiated. An indication of the initiation of the group session is transmitted 1412 to the media content item receiving module 1414, where a media content item is received. An indication of the media content item is transmitted 1416 to the period of time identification module 1418, where a period of time is identified. The period of time is transmitted 1420 to the advertisement selection module 1422, where a selection of advertisements is selected. The selection of advertisements is transmitted 1424 to the advertisement receiving module 1426, where the selection of advertisements is received. The selection of advertisements is transmitted 1428 to the output module 1430, where the advertisements are generated for output at the advertisement output module 1432.

Figure 15:
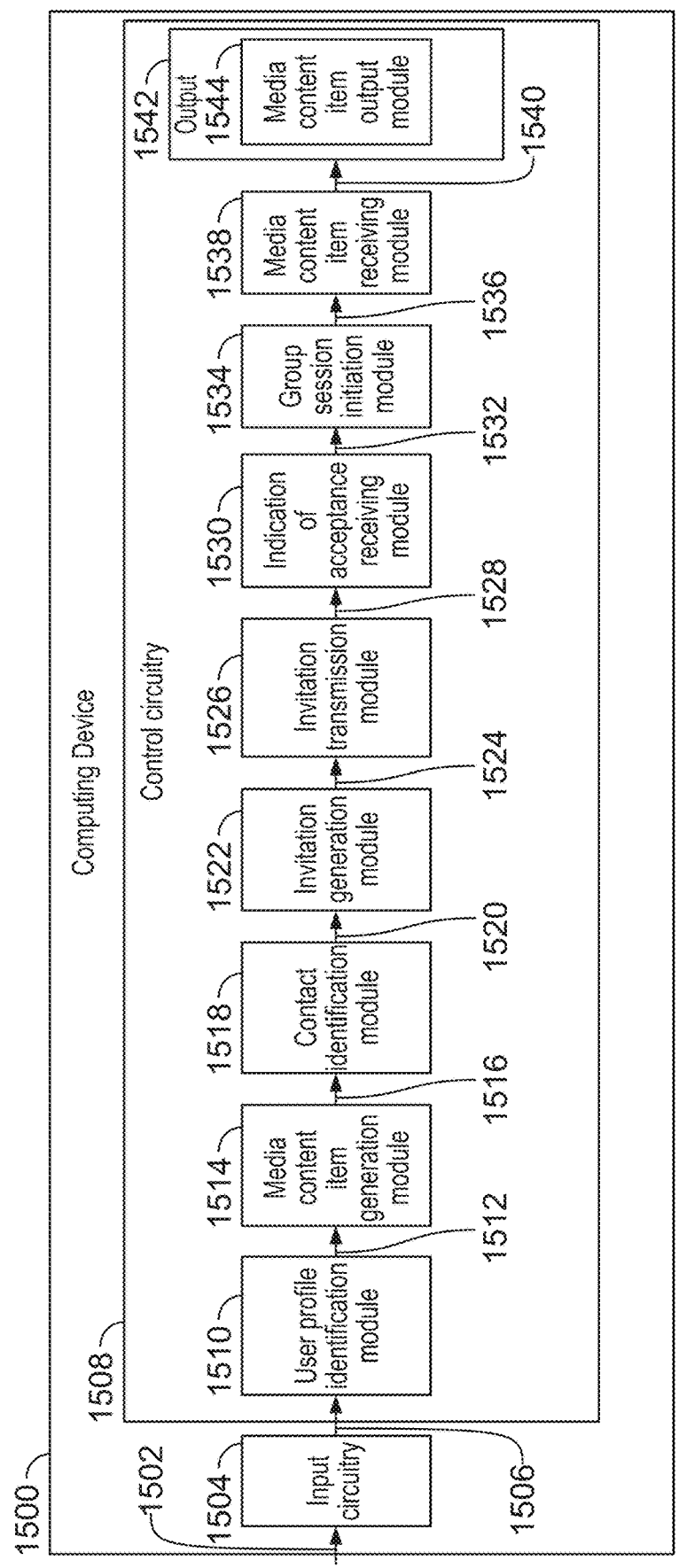
FIG. 15 shows a block diagram representing components of a computing device and dataflow therebetween for initiating a media content item group watch session with an identified contact, in accordance with some embodiments of the disclosure.

FIG. 15 shows a block diagram representing components of a computing device and dataflow therebetween for initiating a media content item group watch session with an identified contact, in accordance with some embodiments of the disclosure. Computing device 1500 (e.g., computing device 102, 202, 302, 402, 702, 802, 902, 1002, 1102, 1202, 1302), as discussed above, comprises input circuitry 1504, control circuitry 1508 and output circuitry 1542. Control circuitry 1508 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1502 by the input circuitry 1504. The input circuitry 1504 is configured to received inputs related to a computing device. For example, this may be via a touchscreen, a keyboard, a mouse and/or a microphone in communication with the computing device 1500. In other examples, this may be via a gesture detected via an augmented, mixed and/or virtual reality device. In another example, the input may comprise instructions received via another computing device, for example, a smart speaker. The input circuitry 1504 transmits 1506 the user input to the control circuitry 1508.

The control circuitry comprises a user profile identification module 1510, a media content item generation module 1514, a contact identification module 1518, an invitation generation module 1522, an invitation transmission module 1526, an indication of acceptance receiving module 1530, a group session initiation module 1534, a media content item receiving module 1538 and an output module 1542 comprising a media content item output module 1544. The input is transmitted 1506 to the user profile identification module 1510, where a user profile is identified. On identifying the user profile, an indication is transmitted 1512 to the media content item generation module 1514, where a media content item is generated for output. The indication of the user profile and an indication of the media content item are transmitted 1516 to the contact identification module, where a contact is identified based on the user profile and the media content item. An indication of the media content item and the contact are transmitted 1520 to the invitation generation module 1522, where an invitation is generated. The invitation is transmitted 1524 to the invitation transmission module 1526, where the invitation is transmitted 1528 to a second computing device (not shown) associated with the contact. On receiving an acceptance of the invitation, for example via a user interface element at the second computing device, an indication of the acceptance is generated and transmitted (not shown) to the computing device 1500, where it is received at the indication of acceptance receiving module 1530. The indication of acceptance is transmitted 1532 to the group session initiation module 1534, where the group session is initiated between the computing device 1500 and the second computing device. An indication of the initiation of the group session is transmitted 1536 to the media content item receiving module 1538, where the media content item is received. The media content item is transmitted to the output module 1542, where it is generated for output at the media content item output module 1544.

Figure 16:
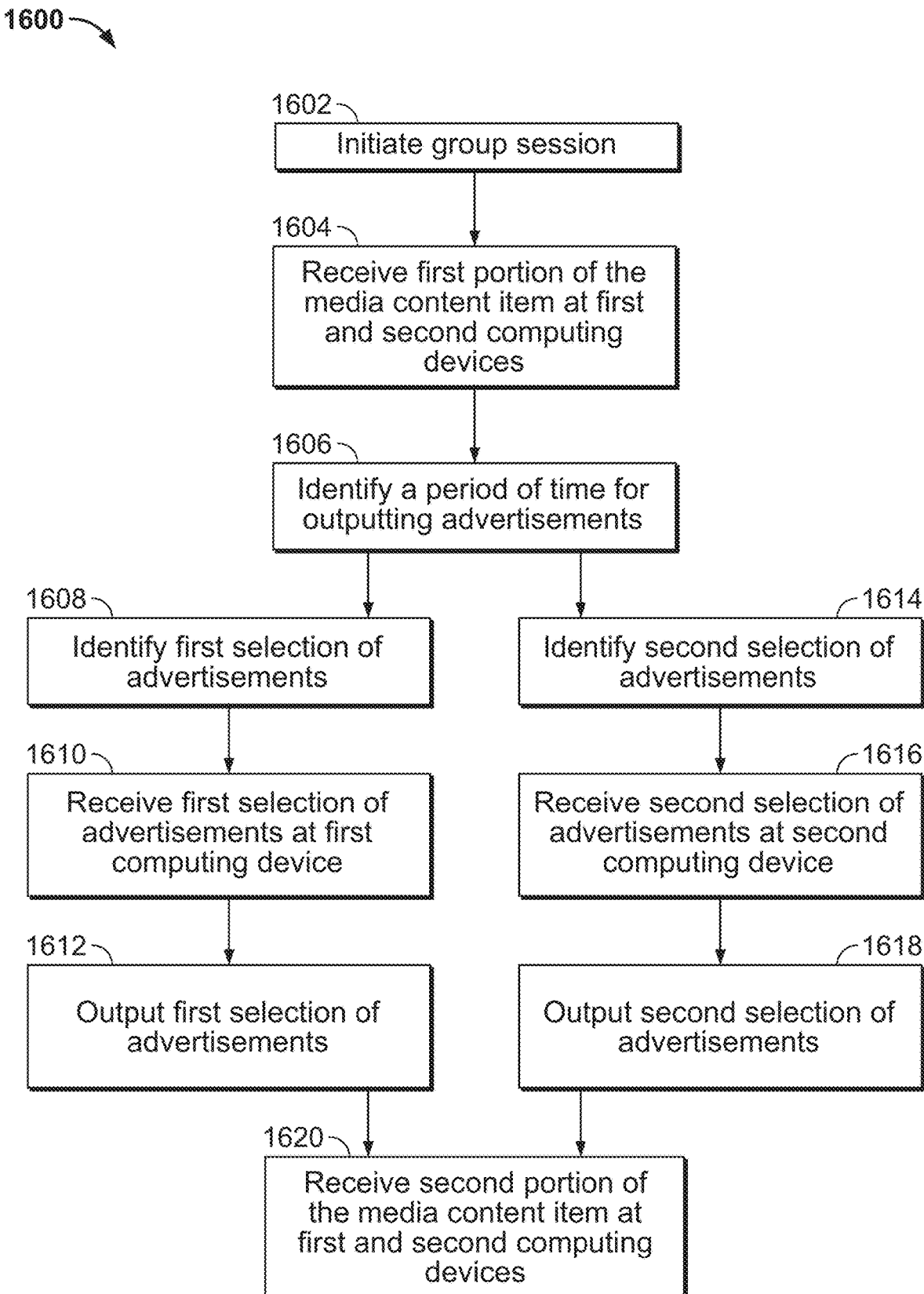
FIG. 16 shows a flowchart of illustrative steps involved in initiating a media content item group watch session with an identified contact, in accordance with some embodiments of the disclosure.

FIG. 16 shows a flowchart of illustrative steps involved in initiating a media content item group watch session with an identified contact, in accordance with some embodiments of the disclosure. Process 1600 may be implemented on any of the aforementioned computing devices (e.g., computing device 102, 202, 302, 402, 702, 802, 902, 1002, 1102, 1202, 1302). In addition, one or more actions of the process 1600 may be incorporated into or combined with one or more actions of any other process or embodiments described herein.

At 1602, a group session between a first computing device and a second computing device is initiated. At 1604, a first portion of the media content item is received at the first and the second computing devices. Typically, the first portion of the media content item is output at the same time, or substantially the same time, at the first and the second computing devices. At 1606, a period of time for outputting advertisements is identified, for example five minutes. At 1608, a first selection of advertisements is identified based on the time period, for example, a first selection of advertisements that fits into a five-minute period is identified. At 1610, the first selection of advertisements is received at the first computing device. These advertisements may be received, for example, from a dedicated server that delivers advertisements. At 1612, the first selection of advertisements is output at the first computing device. Similar steps are carried out in connection with the second computing device. At 1614, a second selection of advertisements is identified based on the time period. At 1616, the second selection of advertisements is received at the second computing device. At 1618, the second selection of advertisements is output at the second computing device. At 1620, a second portion of the media content item is received at first and second computing devices. Typically, the second portion of the media content item is output at the same time, or substantially the same time, at the first and the second computing devices. Having first and second selections of advertisements based on the same time period enables the second portion of the media content item to be output at the same time at the first and the second computing devices.

Figure 17:
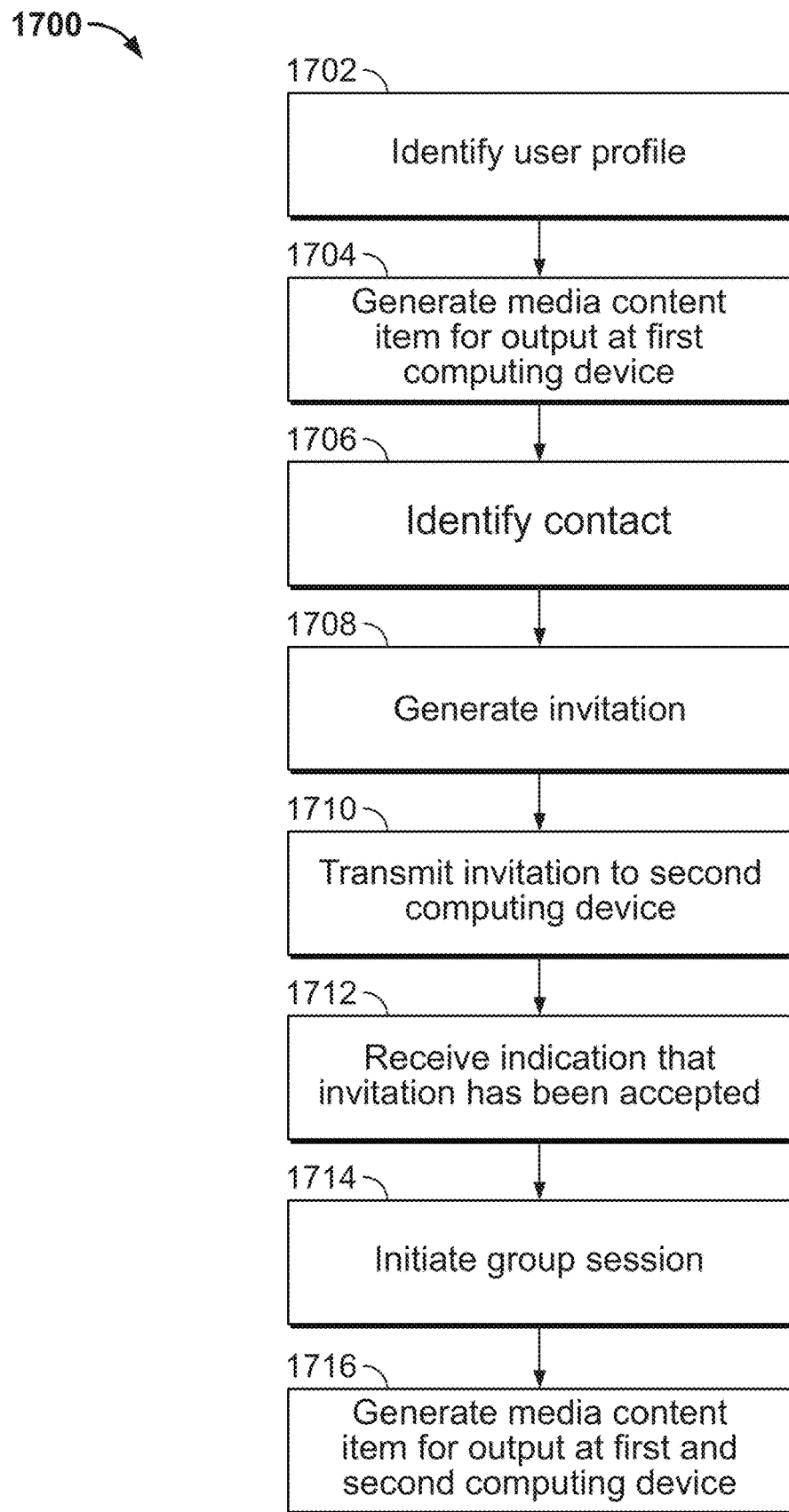
FIG. 17 shows another flowchart of illustrative steps involved in initiating a media content item group watch session with an identified contact, in accordance with some embodiments of the disclosure.

FIG. 17 shows a flowchart of illustrative steps involved in initiating a media content item group watch session with an identified contact, in accordance with some embodiments of the disclosure. Process 1700 may be implemented on any of the aforementioned computing devices (e.g., computing device 102, 202, 302, 402, 702, 802, 902, 1002, 1102, 1202, 1302). In addition, one or more actions of the process 1700 may be incorporated into or combined with one or more actions of any other process or embodiments described herein.

At 1702, a user profile is identified, for example a user profile associated with a social media, and/or video-sharing platform. At 1704, a media content item is generated for output at a first computing device, such as a smartphone. At 1706, a contact is identified via the user profile, for example a friend on a social media network. At 1708, an invitation is generated. The invitation may comprise details about the content item that is being shared and details for transmitting the invitation to the contact, for example, an identifier for a user profile that is associated with the contact. At 1710, the invitation is transmitted to a second computing device, for example, a smartphone at which the contact is logged on to a social network. At 1712, an indication that the invitation has been accepted is received, for example, the indication is sent from the second computing device to the first computing device, in response to receiving a touch event associated with a user interface element at the second computing device. At 1714, a group session is initiated between the first computing device and the second computing device. At 1716, a media content item is received at the first and second computing devices and is generated for output. Typically, the media content item is output at the same time, or substantially the same time, at the first and the second computing devices.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    initiating, between a first computing device and a second computing device, a media content item group session;
    receiving, at the first computing device and the second computing device, a first portion of a media content item;
    identifying, for outputting one or more advertisements, a period of time;
    identifying, for the first computing device, a first selection of two or more advertisements, wherein the first selection of advertisements has a first run-time based on the period of time and comprises a non-interactive advertisement and an interactive advertisement;
    identifying, based on the period of time, an interaction time period associated with the interactive advertisement;
    identifying, for the second computing device, a second selection of one or more advertisements, wherein the second selection of advertisements has a second run-time based on the period of time;
    receiving, at the first computing device and from a server, the non-interactive advertisement of the first selection of advertisements;
    generating, at the first computing device, the interactive advertisement of the first selection of advertisements;
    receiving, at the second computing device, the second selection of advertisements;
    outputting, at the first computing device, the non-interactive advertisement of the first selection of advertisements and the interactive advertisement for the interaction time period; and
    outputting, at the second computing device, an advertisement of the second selection of advertisements.

2. The method of claim 1, wherein the first run-time and/or the second run-time is equal to the period of time.

3. The method of claim 1, wherein the first run-time is less than the period of time, the method further comprising:
    identifying a difference in the first run-time and the period of time;
    identifying a short-form advertisement with a run-time equal to the difference in the first run-time and the period of time; and
    incorporating the short-form advertisement into the first selection of advertisements.

4. The method of claim 1, wherein the first run-time is different from the period of time, the method further comprising:
    identifying a difference between the first run-time and the period of time;
    identifying, based on the difference between the first run-time and the period of time, a playback speed for the advertisement of the first selection of advertisements that causes the first run-time to be equal to the period of time; and wherein:
        outputting the advertisement of the first selection of advertisements further comprises outputting the advertisement of the first selection of advertisements at the identified playback speed.

5. The method of claim 1, further comprising:
    identifying a first user profile associated with the first computing device;
    identifying a second user profile associated with the second computing device; and wherein:
        identifying the first selection of advertisements further comprises identifying the first selection of advertisements based on the first user profile; and
        identifying the second selection of advertisements further comprises identifying the second selection of advertisements based on the second user profile.

6. The method of claim 1, wherein outputting the interactive advertisement further comprises outputting the interactive advertisement and a timer for display, wherein the timer is based on the interaction time period.

7. The method of claim 1, wherein:
    the first selection of advertisements comprises a first personalizable advertisement having a first part and a second part; and
    the second selection of advertisements comprises a second personalizable advertisement having the first part and a third part, wherein the first part is common to the first personalizable advertisement and the second personalizable advertisement, the method further comprising:
        identifying a first user profile associated with the first computing device;
        identifying a second user profile associated with the second computing device;
        identifying, based on the first user profile, the second part of the first personalizable advertisement;
        identifying, based on the second user profile, the third part of the second personalizable advertisement;
        outputting the advertisement of the first selection of advertisements further comprises concurrently outputting the first part and the second part of the first personalizable advertisement; and outputting the advertisement of the second selection of advertisements further comprises concurrently outputting the first part and the third part of the second personalizable advertisement.

8. The method of claim 1, wherein:

receiving the first selection of advertisements further comprises:

receiving a first manifest file, wherein the first manifest file comprises a first link to a second portion of the media content item, a second link to the advertisement of the first selection of advertisements and a third link to a third portion of the media content item; and receiving the second selection of advertisements further comprises:

receiving a second manifest file, wherein the first manifest file comprises a fourth link to the second portion of the media content item, a fifth link to the advertisement of the second selection of advertisements and a sixth link to the third portion of the media content item.

9. A system comprising:

a communication port;

a memory storing instructions; and control circuitry communicably coupled to the memory and the communication port and configured to execute instructions to:

initiate, between a first computing device and a second computing device and via the communication port, a media content item group session;

receive, at the first computing device and the second computing device, a first portion of a media content item;

identify, for outputting one or more advertisements, a period of time;

identify, for the first computing device, a first selection of two or more advertisements, wherein the first selection of advertisements has a first run-time based on the period of time and comprises a non-interactive advertisement and an interactive advertisement;

identify, based on the period of time, an interaction time period associated with the interactive advertisement;

identify, for the second computing device, a second selection of one or more advertisements, wherein the second selection of advertisements has a second run-time based on the period of time;

receive, at the first computing device and from a server, the non-interactive advertisement of the first selection of advertisements;

generate, at the first computing device, the interactive advertisement of the first selection of advertisements;

receive, at the second computing device, the second selection of advertisements;

output, at the first computing device, the non-interactive advertisement of the first selection of advertisements and the interactive advertisement for the interaction time period; and output, at the second computing device, an advertisement of the second selection of advertisements.

10. The system of claim 9, wherein the first run-time and/or the second run-time is equal to the period of time.

11. The system of claim 9, wherein the first run-time is less than the period of time, the system further comprising control circuitry configured to:

identify a difference in the first run-time and the period of time;

identify a short-form advertisement with a run-time equal to the difference in the first run-time and the period of time; and incorporate the short-form advertisement into the first selection of advertisements.

12. The system of claim 9, wherein the first run-time is different from the period of time, the system further comprising control circuitry configured to:

identify a difference between the first run-time and the period of time;

identify, based on the difference between the first run-time and the period of time, a playback speed for the advertisement of the first selection of advertisements that causes the first run-time to be equal to the period of time; and wherein:

the control circuitry configured to output the advertisement of the first selection of advertisements is further configured to output the advertisement of the first selection of advertisements at the identified playback speed.

13. The system of claim 9, wherein the control circuitry is further configured to:

identify a first user profile associated with the first computing device;

identify a second user profile associated with the second computing device; and wherein:

the control circuitry configured to identify the first selection of advertisements is further configured to identify the first selection of advertisements based on the first user profile; and the control circuitry configured to identify the second selection of advertisements is further configured to identify the second selection of advertisements based on the second user profile.

14. The system of claim 9, wherein the control circuitry configured to output the interactive advertisement is further configured to output the interactive advertisement and a timer for display, wherein the timer is based on the interaction time period.

15. The system of claim 9, wherein:

the first selection of advertisements comprises a first personalizable advertisement having a first part and a second part; and the second selection of advertisements comprises a second personalizable advertisement having the first part and third part, wherein the first part is common to the first personalizable advertisement and the second personalizable advertisement, the control circuitry further configured to:

identify a first user profile associated with the first computing device;

identify a second user profile associated with the second computing device;

identify, based on the first user profile, the second part of the first personalizable advertisement;

identify, based on the second user profile, the third part of the second personalizable advertisement; and:

the control circuitry configured to output the advertisement of the first selection of advertisements is further configured to concurrently output the first part and the second part of the first personalizable advertisement; and the control circuitry configured to output the advertisement of the second selection of advertisements is further configured to concurrently output the first part and the third part of the second personalizable advertisement.

16. The system of claim 9 wherein:

the control circuitry configured to receive the first selection of advertisements is further configured to:

receive a first manifest file, wherein the first manifest file comprises a first link to a second portion of the media content item, a second link to the advertisement of the first selection of advertisements and a third link to a third portion of the media content item; and the control circuitry configured to receive the second selection of advertisements is further configured to:

receive a second manifest file, wherein the first manifest file comprises a fourth link to the second portion of the media content item, a fifth link to the advertisement of the second selection of advertisements and a sixth link to the third portion of the media content item.

\* \* \* \* \*